US006871221B1

(12) United States Patent
Styles

(10) Patent No.: US 6,871,221 B1
(45) Date of Patent: Mar. 22, 2005

(54) METHOD AND APPARATUS TO MANAGE NETWORK CLIENT LOGON SCRIPTS USING A GRAPHICAL MANAGEMENT AND ADMINISTRATION TOOL

(75) Inventor: Brian Styles, Coconut Creek, FL (US)

(73) Assignee: Scriptlogic Corporation, Boca Raton, FL (US)

( * ) Notice: Subject to any disclaimer, the term of this patent is extended or adjusted under 35 U.S.C. 154(b) by 0 days.

(21) Appl. No.: 09/489,759

(22) Filed: Jan. 21, 2000

(51) Int. Cl.[7] ............................................. G06F 15/177
(52) U.S. Cl. .................... 709/221; 709/220; 709/222; 709/226
(58) Field of Search ................................ 709/220, 221, 709/222, 226

(56) References Cited

U.S. PATENT DOCUMENTS

| | | | | |
|---|---|---|---|---|
| 5,832,503 A | * | 11/1998 | Malik et al. ................ | 709/223 |
| 5,838,907 A | * | 11/1998 | Hansen ........................ | 709/220 |
| 5,838,918 A | * | 11/1998 | Prager et al. ............... | 709/221 |
| 5,926,463 A | * | 7/1999 | Ahearn et al. | |
| 5,974,547 A | * | 10/1999 | Klimenko ...................... | 713/2 |
| 5,999,741 A | * | 12/1999 | May et al. .................... | 717/173 |
| 6,029,196 A | * | 2/2000 | Lenz ............................ | 709/221 |
| 6,092,196 A | * | 7/2000 | Reiche ........................ | 713/200 |
| 6,209,031 B1 | * | 3/2001 | Casey et al. ................ | 709/222 |
| 6,226,751 B1 | * | 5/2001 | Arrow et al. ............... | 713/201 |
| 6,243,747 B1 | * | 6/2001 | Lewis et al. ................ | 709/220 |
| 6,252,858 B1 | * | 6/2001 | Inoue .......................... | 370/254 |
| 6,256,635 B1 | * | 7/2001 | Arrouye et al. ............. | 707/102 |
| 6,314,565 B1 | * | 11/2001 | Kenner et al. .............. | 717/171 |
| 6,324,543 B1 | * | 11/2001 | Cohen et al. ............... | 707/200 |
| 6,330,710 B1 | * | 12/2001 | O'Neil et al. ................ | 717/100 |
| 6,345,294 B1 | * | 2/2002 | O'Toole et al. ............. | 709/222 |
| 6,347,398 B1 | * | 2/2002 | Parthasarathy et al. ..... | 717/178 |
| 6,349,306 B1 | * | 2/2002 | Malik et al. ............ | 707/103 R |
| 6,442,682 B1 | * | 8/2002 | Pothapragada et al. ........ | 713/1 |
| 6,449,642 B2 | * | 9/2002 | Bourke-Dunphy et al. . | 709/222 |
| 6,466,972 B1 | * | 10/2002 | Paul et al. ................... | 709/222 |

* cited by examiner

Primary Examiner—Saleh Najjar
(74) Attorney, Agent, or Firm—Jon A. Gibbons; Fleit, Kain, Gibbons, Gutman, Bongini & Bianco P.L.

(57) ABSTRACT

A GUI (Graphical User Interface) Manager is used by a network administrator to fill-in predefined templates. The administrator does not need to compile, debug or write a single line of scripting code. The GUI manager has a "select the box" and "point and click" and "fill-in the blank" approach for selecting computer settings. The predefined configuration and/or template(s) are used by a logon script program on a client system to manage the configuration of resources on at least one client. There are three levels of resources that can be managed. The first type of resource is an operating system. The second type of resource is an application resource. And the third type of resource is to redirect a resource on the client to a resource on a network such as a drive letter mapping. Resources include configurations from the group of configuration settings consisting of drive mappings, shell folders, printer deployment, proxy server access, application paths, service packs, anti-virus updates, policies and automatic mail profile creation. In another embodiment, validation logic is used on the clients' system during the execution of an application program that takes the template and applies the defined configuration settings in the template to the clients' system so as to automatically configure at least one configuration setting for a user if the combination of one or more predefined conditions for a selected group, a selected operating system and a selected connection method are met. In still another embodiment, an interpretive engine is used on the client's system to permit the administration of client resources with a template while also allowing network administrators to build their own custom logon scripts.

29 Claims, 25 Drawing Sheets

FIG. 12

METHOD AND APPARATUS TO MANAGE NETWORK CLIENT LOGON SCRIPTS USING A GRAPHICAL MANAGEMENT AND ADMINISTRATION TOOL

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of client-server computing, and more particularly relates to the field of network administration and management tools called logon scripts.

2. Description of the Related Art

The field of client-server computing continues to grow. Networks such as LANs, Intranets, the Internet and the World-Wide Web are based on client-server topologies. The growth of client-server computing has lead to an increase demand on the administration of networks by administrators.

The administrators must set up for each client, what shared applications the client will have access to, defining the desktop layout and security, and other client configurations. As an example, one application from Microsoft Corporation called Outlook often requires client user configuration guided by an installation wizard. However, many computer users may not know what to enter for the wizard or may provide incorrect values, so network administrators have made use of logon scripts to provide a pre-configured environment.

The term "logon script" is the set of executables or scripts or batch files that a client system runs during logon, which may be locally stored on the client of retrieved from a server that defines the resources, security and the configuration for each client. Operating systems 306 such as Microsoft Windows NT4.0 provide some setting for applications that can be configured automatically during the clients' boot-up and login in the client default profile or through system policies. However, some of the settings for applications and resources, such as mapping a drive letter to a network resource or connecting to a network printer or automatic software deployment, that fall between the cracks of what Windows NT allows administrators to configure automatically for each client. For these settings custom logon scripts files or custom executables have been used.

Logon scripts have been around with products such as Novell Inc.'s Netware™ products for years. The Novell products are not the only scripting products available, and other scripts are possible in operating system 306 such as Windows NT 4.0 Logon scripts are very useful tools in the network environment. Logon scripts automatically run during the logon process and can help set up the client working environment by copying files, creating connections, and launching applications. The logon process can be summarized as the sequence events between the time a user enters their authentication information (e.g., userid and password) and the time the computer is ready to be used (e.g. the desktop is loaded and the user can begin work).

In fact it is common today for most corporate networks to use logon scripts because they assist with centralized administration, however logon scripts are difficult to create, edit and administer. Also, logon scripts in certain environments such as Windows NT can be assigned to a single users or multiple user by entering the script name in the user manager for domains. The scripts are placed in the domain controller's NetLogon share (%systemsroot%\systems32\repl\import\scripts) and can be setup to replicate across all domain controllers for ease on the administrator. For further information on Windows NT refer generally to Microsoft Press, "Managing a Windows NT Network Notes from the Field", Copyright 1999 Microsoft Corporation.

These logon scripts although useful for help administering and managing networks are not without there shortcomings. One shortcoming with logon scripts today is that they are written in a special scripting language or DOS batch files and must be hand edited and debugged. The requirement to write and debug logon scripts across an enterprise network installation is time consuming and expensive. Accordingly, a need exists for a method and apparatus to provide a centralized configuration.

Another shortcoming with current logon scripts is that they are cumbersome to manage across several clients. To centrally manage clients, network administrators make use of batch files and scripts that are customized to each client. The process of managing custom batch files for each user and/or computer is tedious. Moreover, the simple logon scripting languages, such as DOS batch files cannot support the complex features of network administration. More complex feature such as group memberships, printer deployment, proxy server access, MS Office paths, service packs, anti-virus updates, policies and automatic Outlook/Exchange mail profile creation are not supported in many logon scripts. The administrators of large networks are then forced to make a difficult choice of either learning a more complex logon scripting language and attendant debugger or forego supporting more complex features centrally in the network administration. Accordingly, a need exists for a method and an apparatus to provide administration of a plurality of clients across a network without that is able to handle more complex support features without the need to debug a single line of code.

Still another shortcoming with current logon scripts is that there is no method to validate if a desired setting is proper for a given user on a given client system. Stated differently, certain resources should not be set if a giving group, a selected operating system and a selected connection method is not meets. For example a logon script may request a certain drive letter for the client, say drive letter "O" to be mapped a particular resource, say a CD ROM on a server, however this can only happen if the user of the client is a member of a particular group. Today no method exists for the client to verify a logon script for one or more predefined conditions. Accordingly, a need exists for a method to permit clients to validate logon scripts.

SUMMARY OF THE INVENTION

A GUI Manager is used by a network administrator to fill-in predefined templates. The administrator does not need to compile, debug or write a single line of scripting code. The GUI manager has a "select the box" and "point and click" and "fill-in the blank" approach for selecting computer settings. The predefined template or templates are used by a logon script program on a client system to manage the configuration of resources on at least one client. There are three levels of resources that can be managed. The first type of resource is an operating system. The second level is a resource for an application. And the third type of resource is to redirect a resource on the client to a resource on a network such as a drive letter mapping. Resources include configurations from the group of configuration settings consisting of drive mappings, shell folders, printer deployment, proxy server access, application paths, service packs, anti-virus updates, policies and automatic mail profile creation.

In another embodiment validation logic is used on the clients' system during the executing an application program that takes the template and applies the defined configuration settings in the template to the clients' system so as to automatically configure at least one configuration setting for a user if the combination of one or more predefined conditions for a selected group, a selected operating system and a selected connection method are met.

In still another embodiment, an interpretive engine is used on the client's system to permit the administration of client resources with a template while also allowing network administrators to build their own custom logon scripts.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIGS. 8–25 are exemplary screen shots of the graphical scripting tool according to the present invention.

DETAILED DESCRIPTION OF AN EMBODIMENT

Glossary of Terms Used in this Disclosure configuration setting—a setting in an information processing system such as a PC during a boot-up and logon process. The configuration settings can be broken down into three categories. The first category is for setting an operating system, that can include configurations settings for an operating system such as a 4-digit year, type of wall paper, type of screen saver, 24 hour clock. The second category is for setting for one or more application such as mapping a default drive for a wordprocessor's document files, the path of the backup files and the default open and save path for a wordprocessor. The third category is for the mapping of a resource on a client to a resource on a network, such as a drive, CD ROM drive, tape drive or printer.

connection method—the method by which a client system is communicating to a server system. For example is the client system physically wired to a network (e.g. LAN, RAS, VPN) or is the system dialing in over a telecommunications line or broadcast transmission (e.g. dial-up Networking).

group—a collection of users of user accounts. Groups are typically created to simplify the task of managing and defining rights for a large number of users. A user can belong to more than one group. For example, a user might belong to the manager group, the advisory group and the golf group. Another example is a sales team, human resources department were groups definitions or memberships typically follow departments, workgroups and physical locations.

information processing system—a system capable of processing data and information and integrated with processes such as office automation and data communication. An information processing system can be embodied in a variety of hardware such as a PC, or microprocessor-based system.

interpreter or interpretive engine—a computer program that can interpret and execute statements in a source program without the performing the intermediate steps of compiling the source program into machine language.

interpretive program language—the source programing language used by an interpretative engine.

operating system—software that controls the execution of programs and that may provide services such as resource allocation, scheduling, input/output control, and data management and administration. Although operating system are predominately software, partial hardware implementations are possible.

template—a structure for holding one or more settings to configure the runtime environment of a client information processing system which are independent of the operating system 306 running on the client computer.

user—a person requiring the services of an information processing system.

validation—the processes of taking testing one or more entries in a template against predefined boundary points, criteria or files.

One Embodiment of a Network System For Running the Graphical Logon Tool

Figure 1:
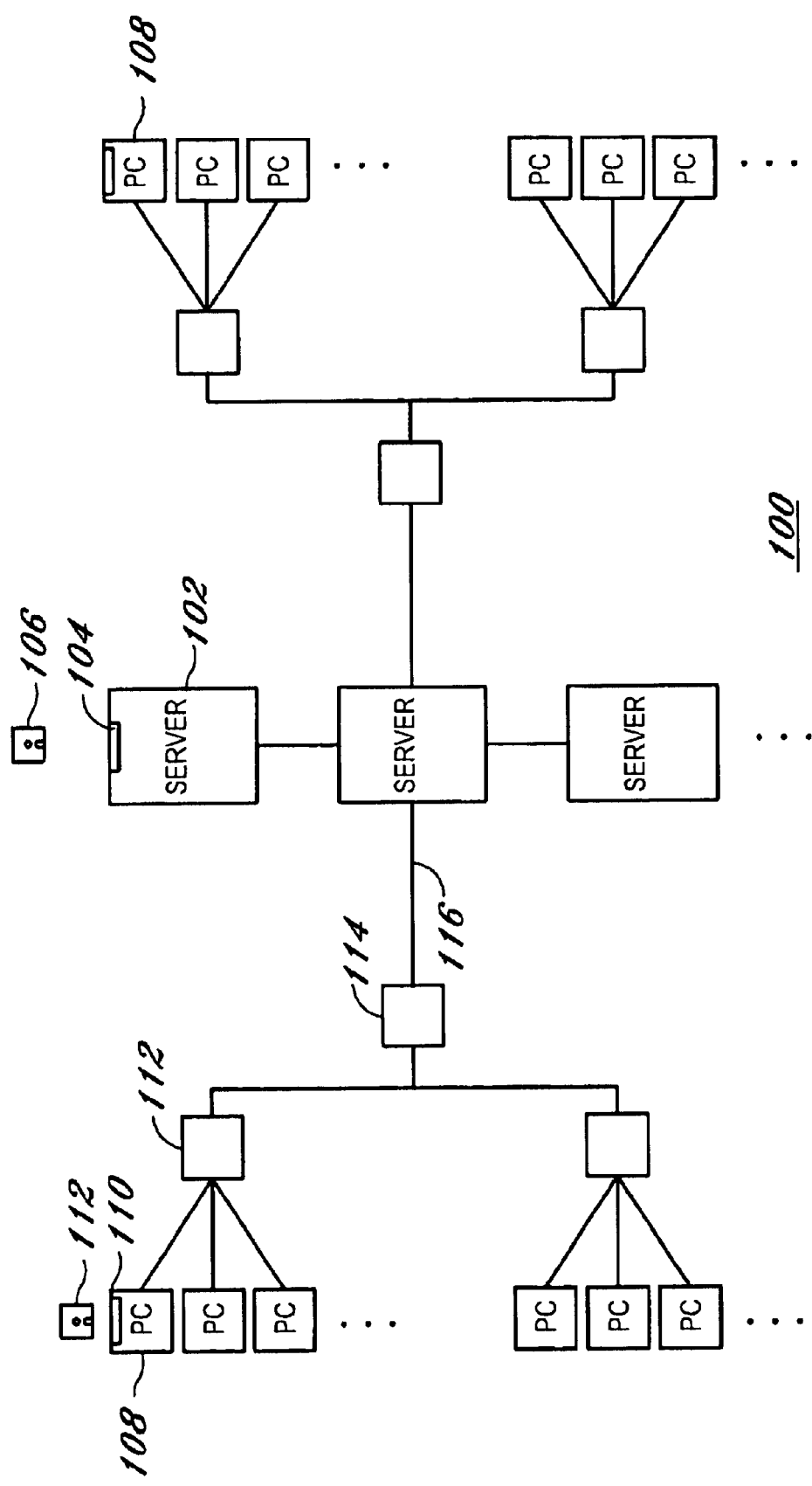
FIG. 1 is a block diagram of a client-server system for carrying out this present invention.

FIG. 1 is a block diagram of a client-server system 100 for carrying out this present invention. A server information processing system 102 such as a PC server such as those available from IBM and Compaq or a server from Sun Microsystems or equivalent. The server 102 has an interface 104 for reading programming information from a computer readable medium 106 such as a floppy diskette, CD ROM, DVD ROM, Flash Memory or other removable computer readable medium. The server 102 is linked to a plurality of client information processing systems 104, such as a PC via a network 116 through gateway 114 and router 112.

In addition, one or more of the clients 108, may have an interface 110 for reading programming information from a computer readable medium 112 such as a floppy diskette, CD ROM, DVD ROM, Flash Memory or other removable computer readable medium.

Figure 2:
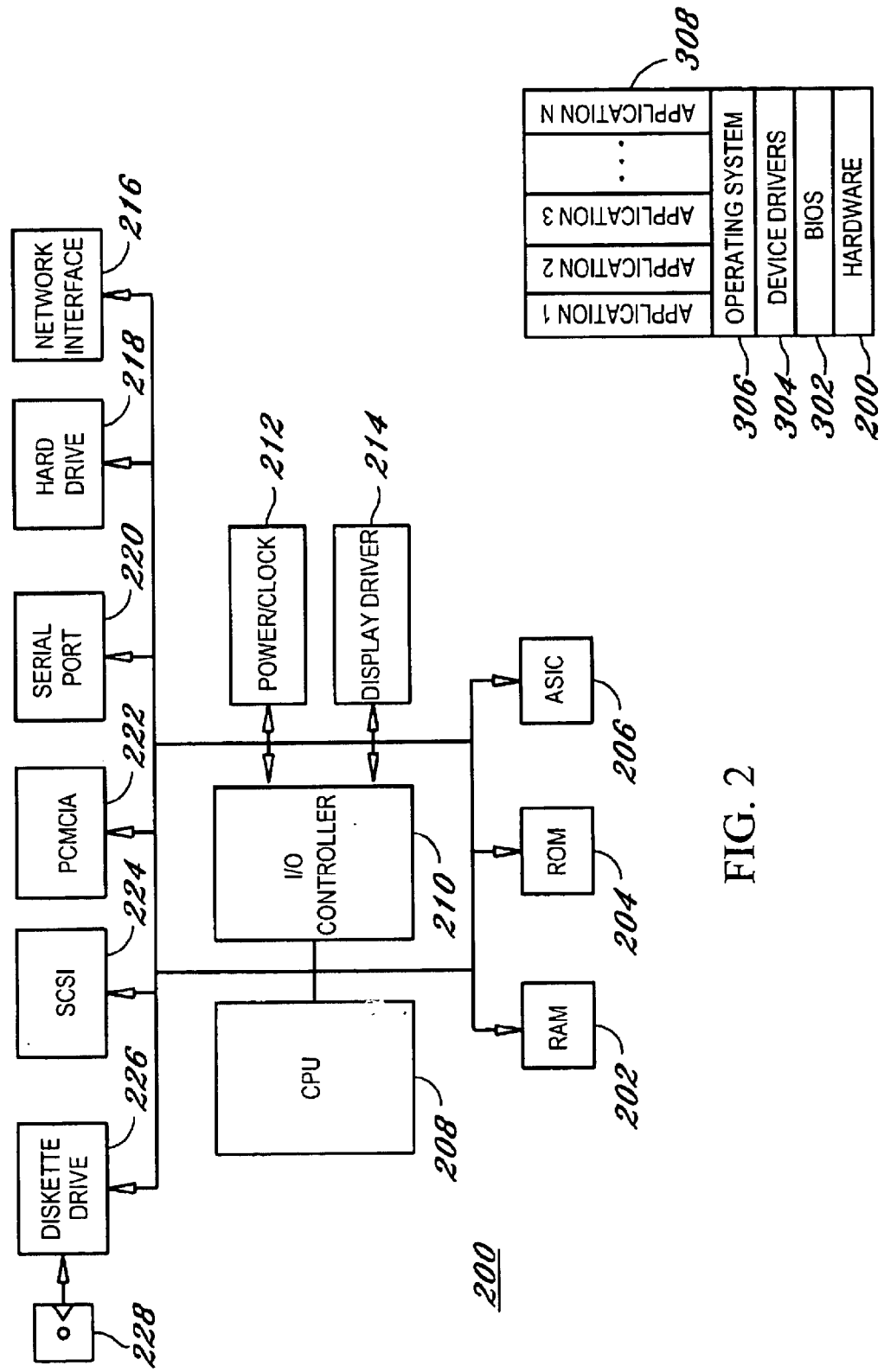
FIG. 2 is a block diagram of the major electrical components of an information processing system according to the present invention.

Referring to FIG. 2, there is shown a block diagram of the major electrical components of an information processing system 200 in accordance with this invention. The electrical components include: a central processing unit (CPU) 208, an Input/Output (I/O) Controller 210, a system power and clock source 212; display driver 214; RAM 202; ROM 204; ASIC (application specific integrated circuit) 206 and a hard disk drive 218. These are representative components of a computer. The operation of a computer comprising these elements is well understood. Network interface 216 provides connection to a computer network such as Ethernet, TCP/IP or other popular protocol network interfaces. Optional components for interfacing to external peripherals include: a Small Computer Systems Interface (SCSI) port 224 for attaching peripherals; a PCMCIA slot 2224; and serial port 220. An optional diskette drive 226 is shown for loading or saving code to removable diskettes 228 or equivalent computer readable media. It is important to note that the system 200 can be implemented as any or all of the two information processing components of FIG. 1, the client 108, the server 102.

The system 200 may be implemented by combination of hardware and software. Moreover, the functionality required for using the invention may be embodied in computer-readable media (such as 3.5 inch diskette 228 or 106 or 112) to be used in programming an information-processing apparatus (e.g., a personal computer) to perform in accordance with the invention. Computer program means or computer program in the present context mean any expression, in any language, code or notation, of set of instructions intended to cause a system having an information processing capability to perform a particular function either directly or after either or both of the following: a) conversions to another language, code or notation; b) reproduction in a different material form.

Figure 3:
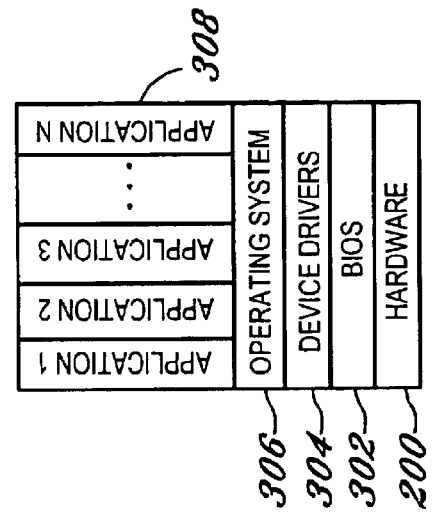
FIG. 3 is a block diagram illustrating the software hierarchy for the information processing device of FIG. 2 according to the present invention.

FIG. 3 is a block diagram illustrating the software hierarchy for the information processing system of FIG. 2 according to the present invention. The hardware 200 is the information processing system of FIG. 2. BIOS (Basic Input Output System) 302 is a set of low level of computer hardware instructions, usually stored in ROM 206, for communications between an operating system 306, device driver(s) 304 and hardware 200. Device drivers 304 are hardware specific code used to communicate between and operating system 306 and hardware peripherals such as a mouse, CD ROM drive or printer. Applications 308 are software application written in C/C++, Java, assembler or equivalent. Operating system 306 is the master program that loads after BIOS 302 initializes, that controls and runs the hardware 200. Examples of operating systems include DOS, Windows 3.1/95/98/NT, Linux, Unix, Macintosh, OS/2 and equivalent. In one embodiment, the graphical scripting tool is an application 308 that resides on the Server 102 and communicates with client 108 over the network 116. In another embodiment, the graphical scripting tool is an application 308 that runs on the client 108 that may be downloaded from the Server 102 such as a Java Application or loaded via computer readable medium 228 on the client 108. In yet another embodiment, the graphical scripting tool is a hybrid application 308 that exists both on the Server 102 and on the client 108. The graphical scripting tool operates in a stand-alone manner and communicates with the server 102 for submission of the intellectual property application.

The present invention can be realized in hardware, software, or a combination of hardware and software. The graphical scripting tool according to the present invention can be realized in a centralized fashion in one computer, or in a distributed fashion where different elements are spread across interconnected computer systems. Any kind of computer system—other apparatus adapted for carrying out the method described herein is suited. A typical combination of hardware and software could be a general purpose computer system such that it carries out the methods described herein. The present invention can also be embedded in a computer program product, which comprises all the features enabling the implementation of the methods described herein, and which—when loaded in a computer system—is able to carry out these methods.

One Embodiment of a Graphical Logon Tool Over-All Architecture

Figure 4:
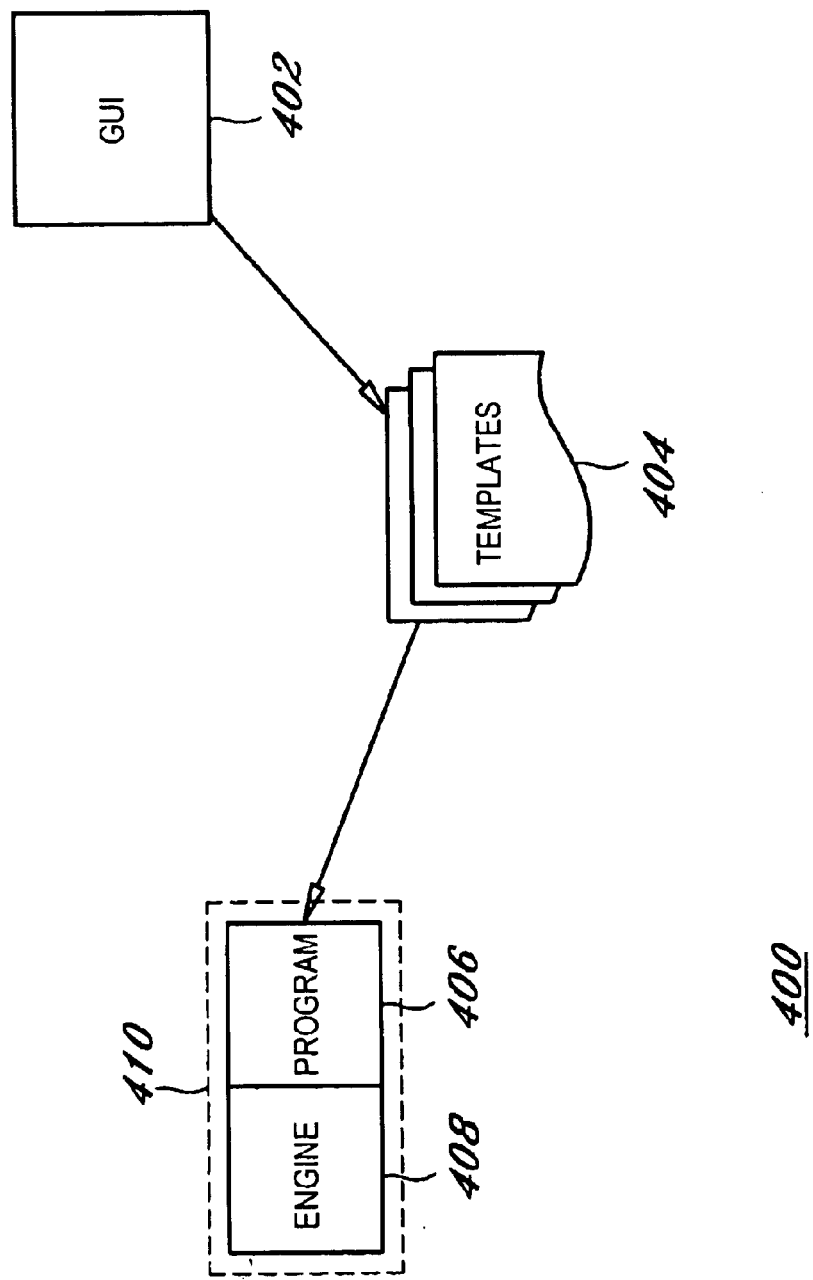
FIG. 4 is a high level block diagram of the over all client-server graphical logon tool architecture according to the present invention.

Turning now to FIG. 4, shown is a high level block diagram 400 of the over all client-server graphical logon tool architecture according to the present invention. The application 308 running on the server presents a GUI Manager 402. The GUI Manager 402 is used by a network administrator is used to configure settings and entries in templates 404. Besides storing the entries selected by the administrator, the template may also contained validation criteria (not shown) that tests to see if the entry is within a predetermined range. In one embodiment, the application 308 on the client 108 contains two components an engine 408 and a program 406 that reads the settings in the templates 404 programs. The combination of the engine 408 and the program 406 are the two major components of the logon script program 410. The engine 408 in this embodiment is a commercially available interpretative engine. The KixStart™ has been shown to be operate well but other engines or compiled languages can also be used. Optionally, the program 406 may be encrypted by compiled so as to prevent unauthorized access or tampering with by anyone using the tool or trying to change the logon settings of a client 108.

There are two core components to logon script program 410. Both of these components are composed of a number of executable files, dynamic link libraries, and configuration files. The two core components are:

1. The program 406 and templates 404 "script".
2. The GUI Manager 402.

While network clients 108 are the true benefactor of logon script program 410 both, core components are installed to and reside on the client-server system 100 network's domain controllers.

The GUI Manager 402 component is the intuitive GUI-based tool that provides the ability to centrally configure and save the configuration settings for the script component. The GUI Manager 402 stores configuration settings to a single file—SLconfig.kix.

One Embodiment of a Graphical Logon Client-Server Process Flow

Figure 5:
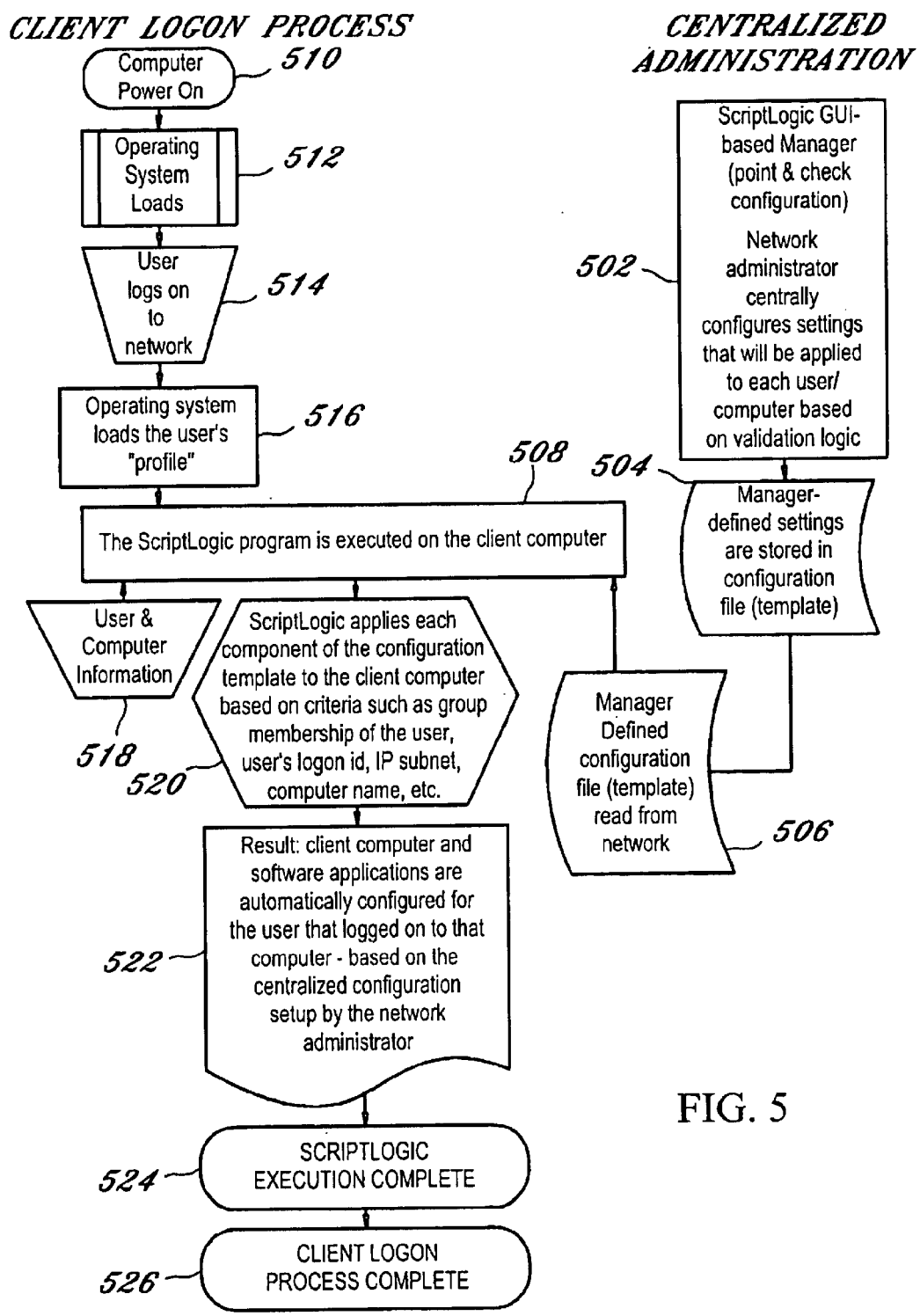
FIG. 5 is a flow diagram of the client-server process flow according to the present invention.
Figure 7:
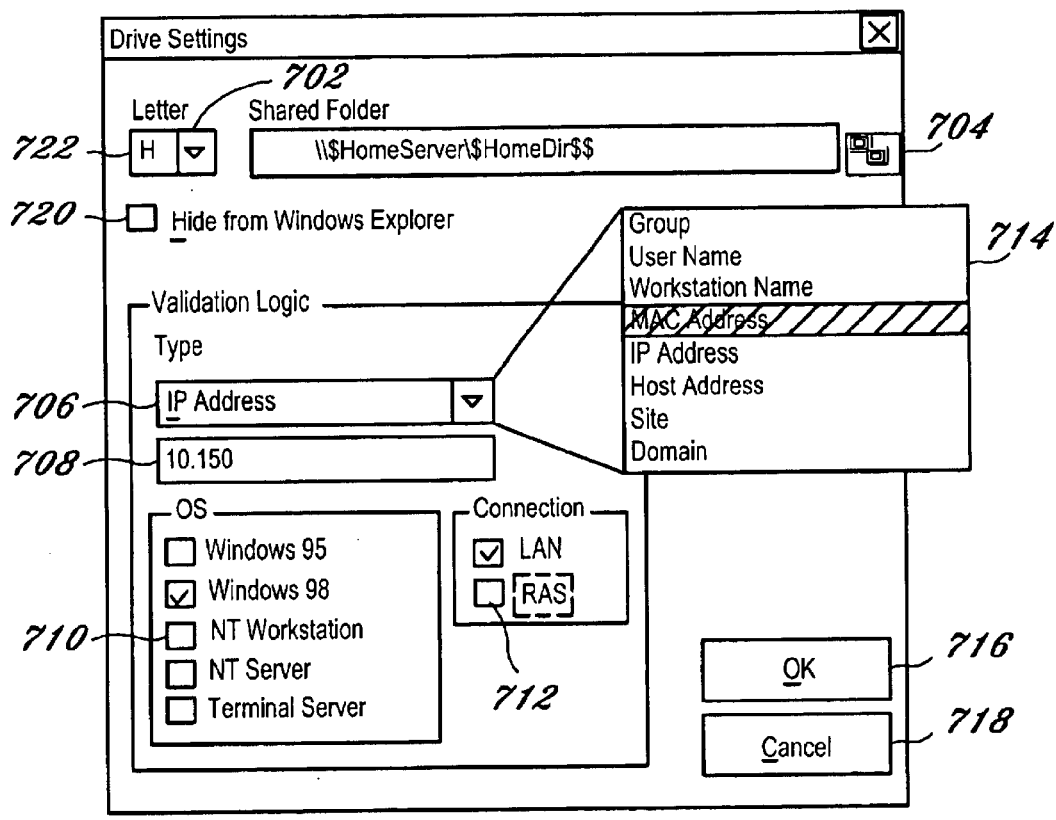
FIG. 7 is an exemplary screen shot of a the graphical scripting tool for drive settings according to the present invention.
Figure 8:
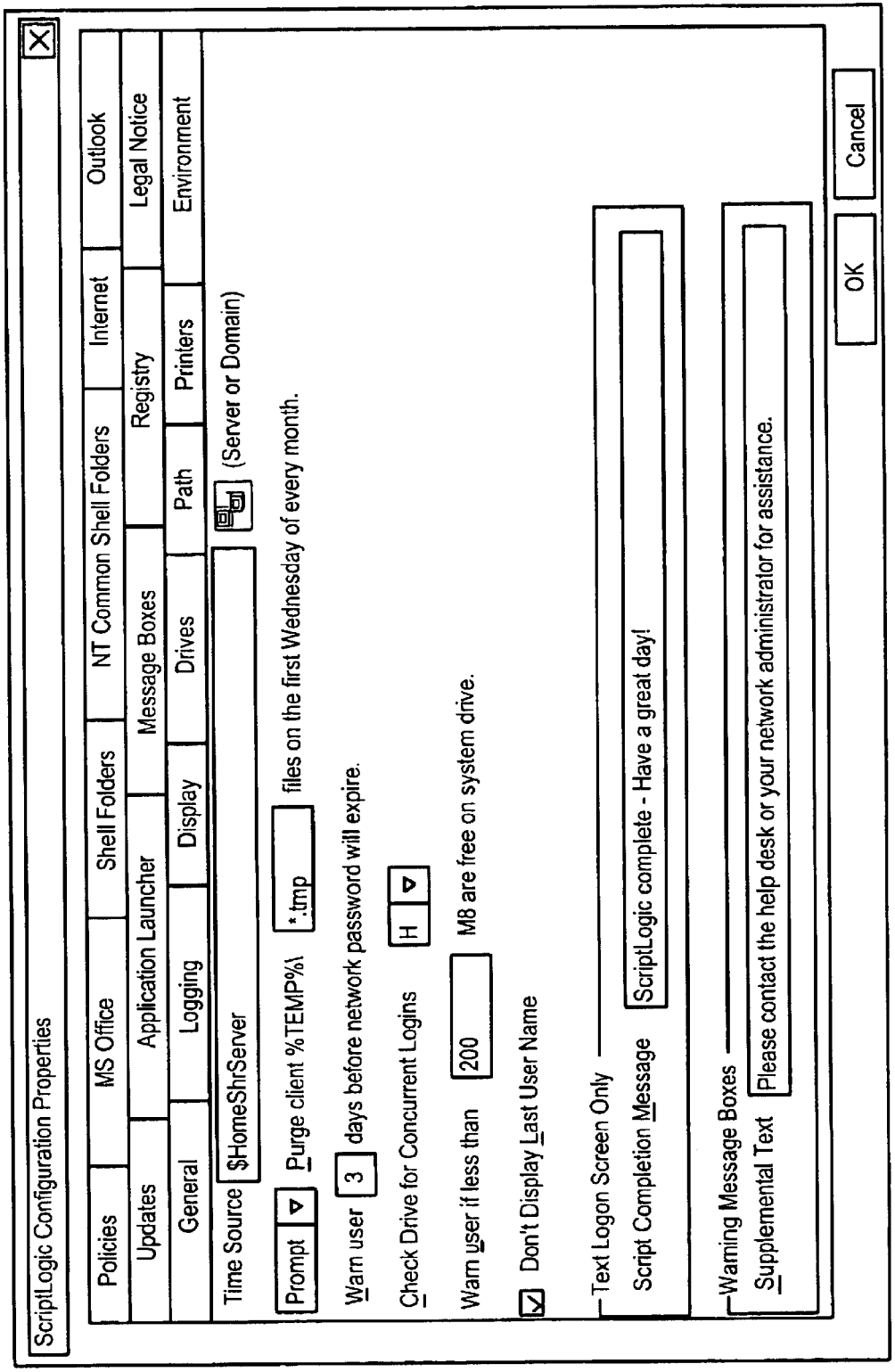
Figure 9:
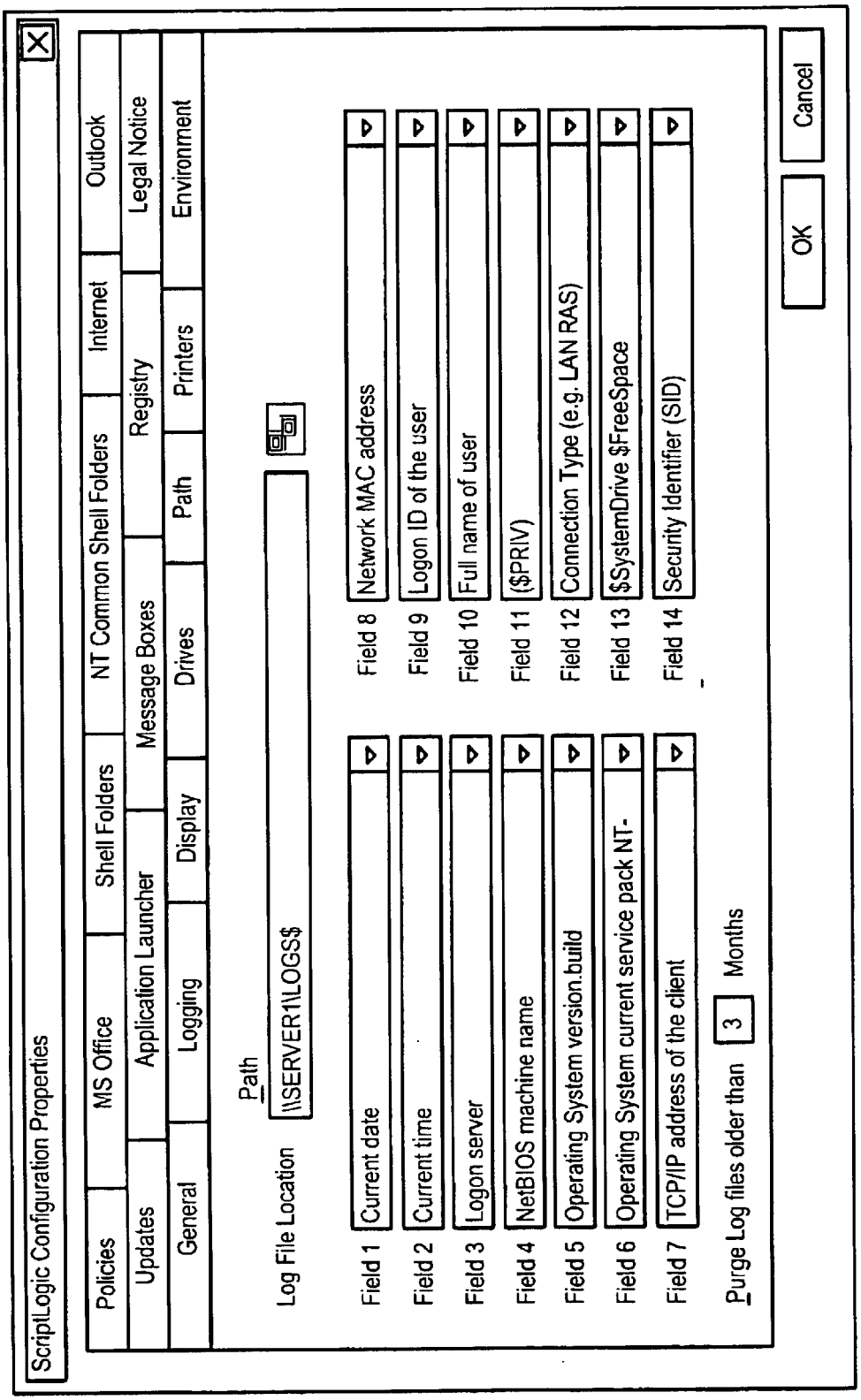
Figure 10:
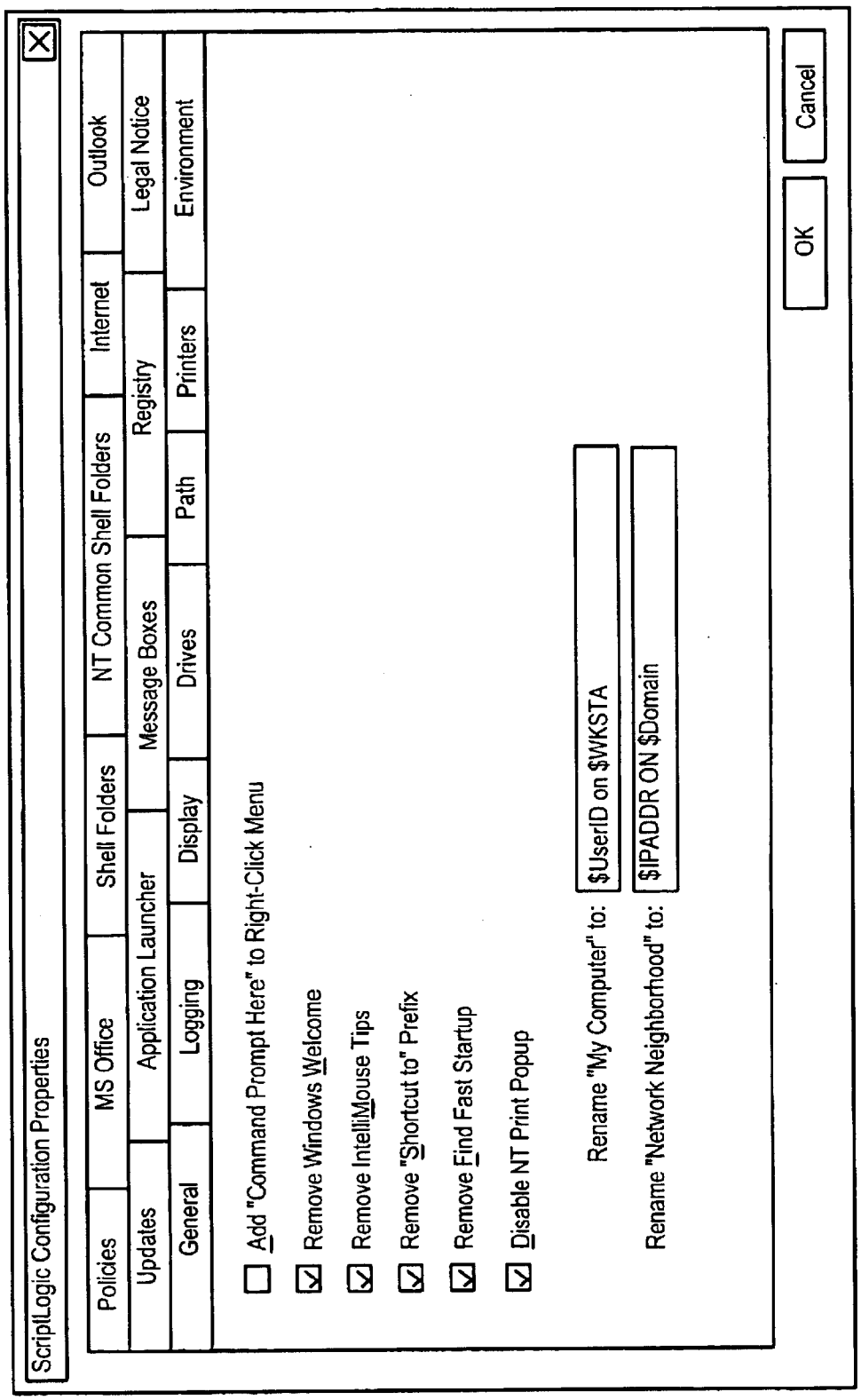
Figure 11:
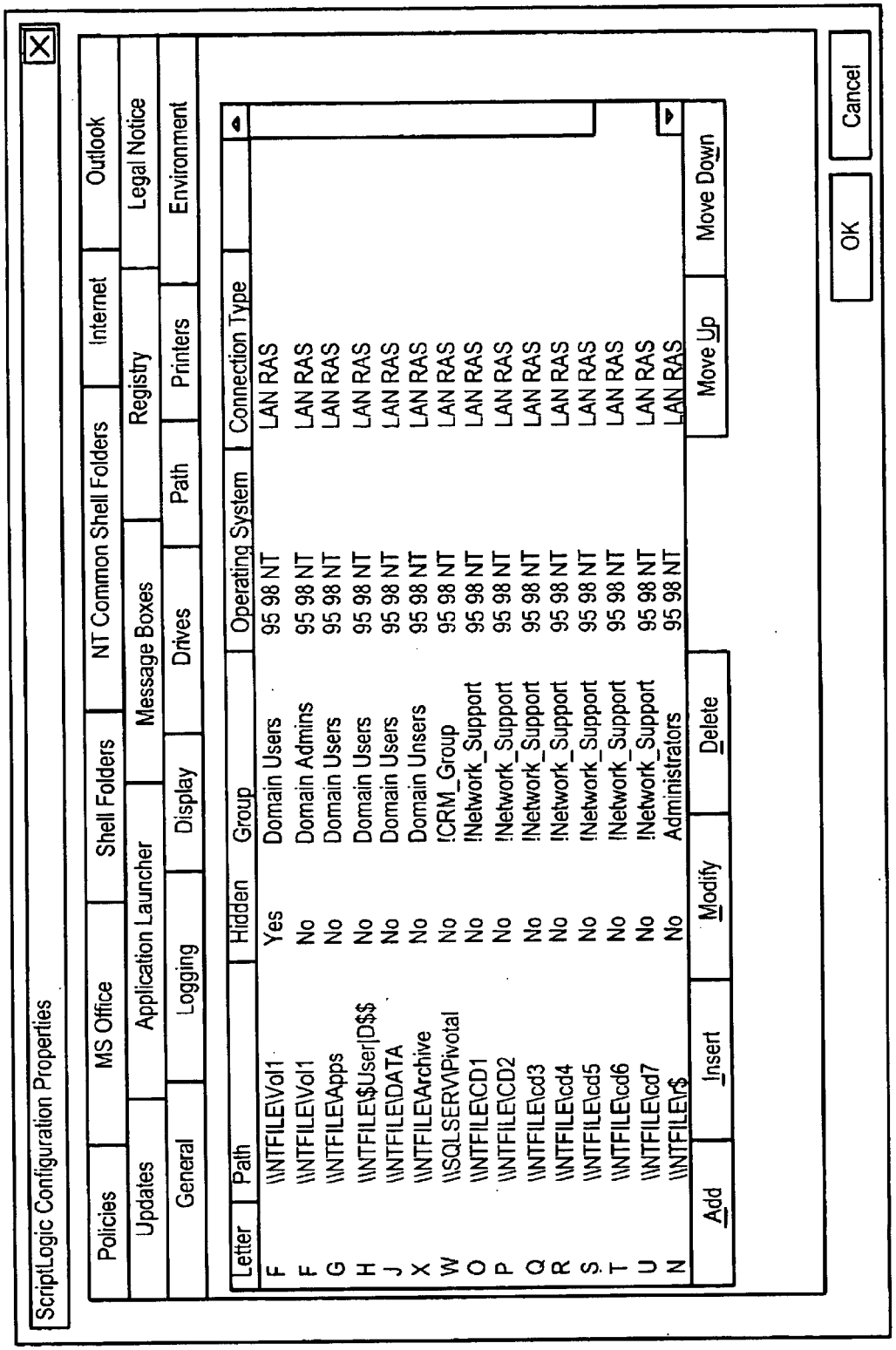
Figure 13:
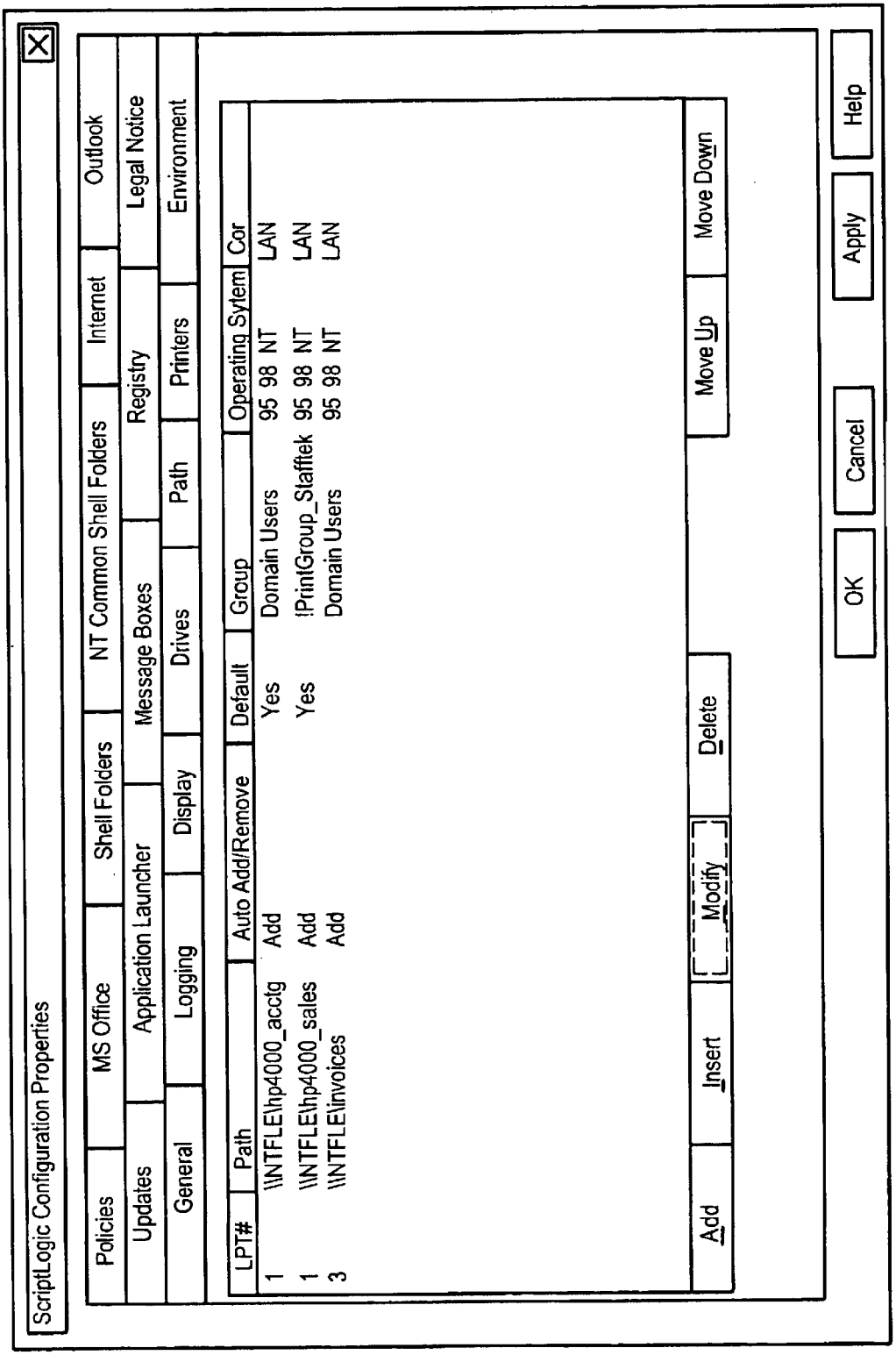
Figure 14:
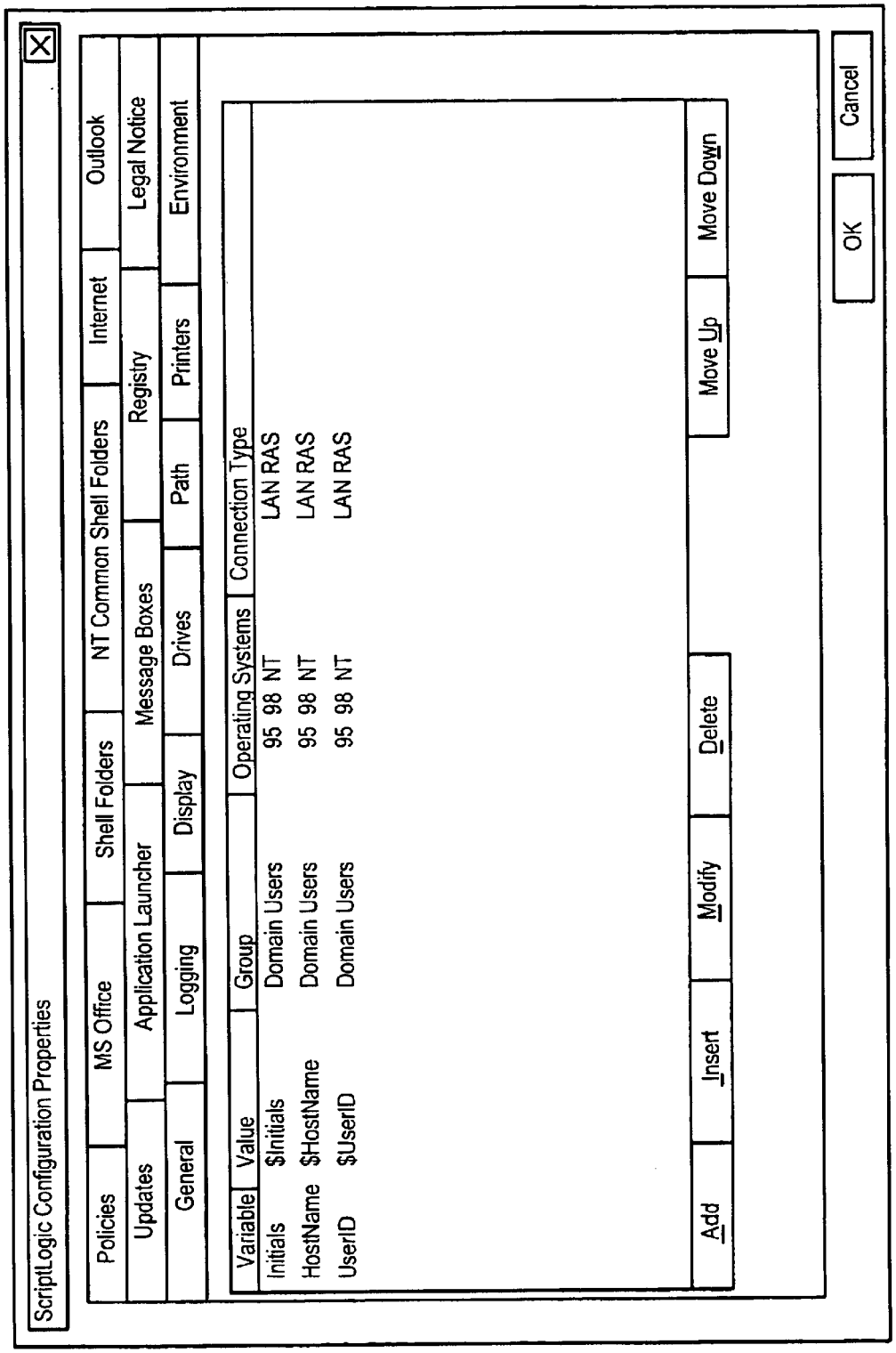
Figure 15:
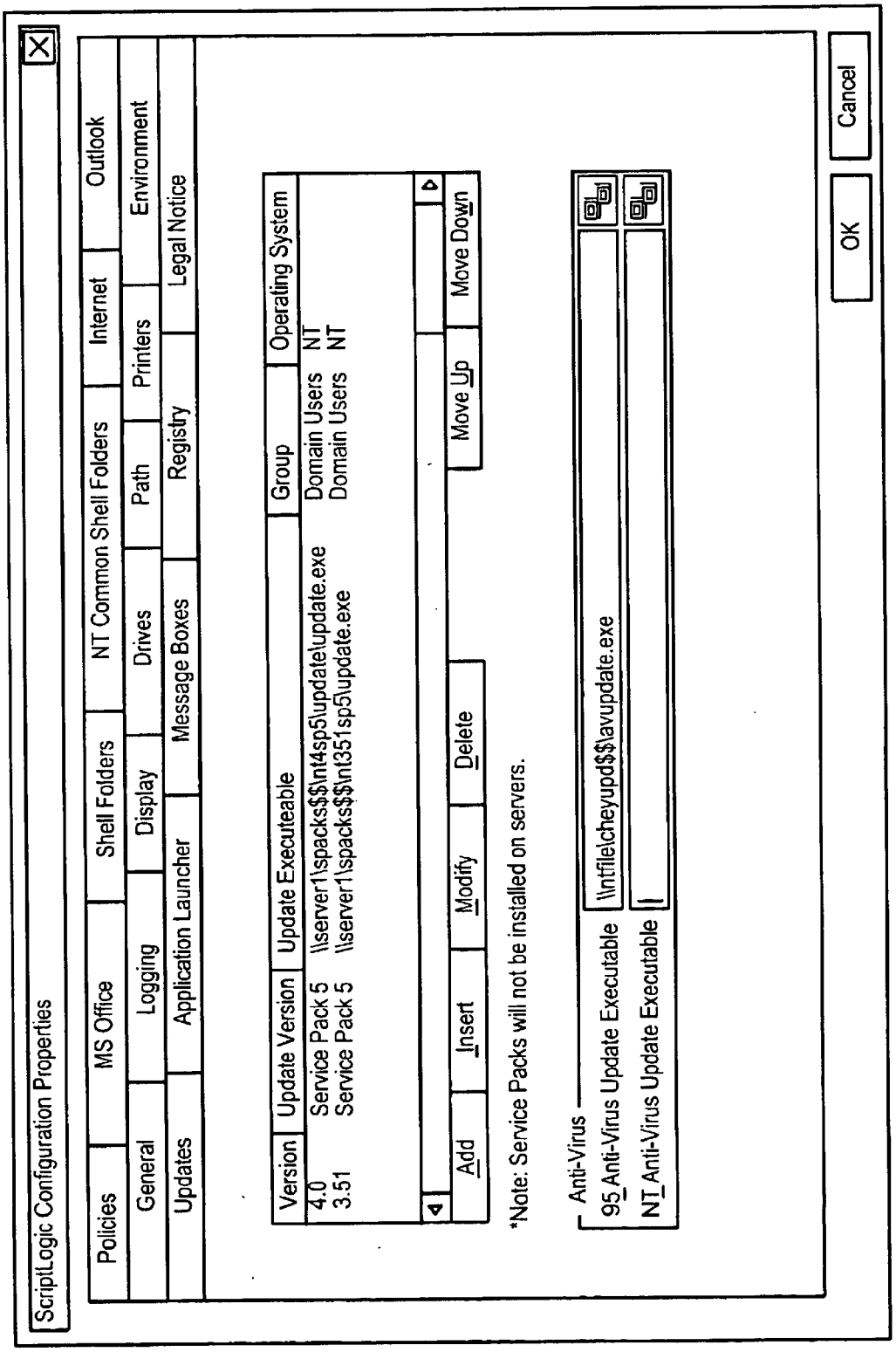
Figure 16:
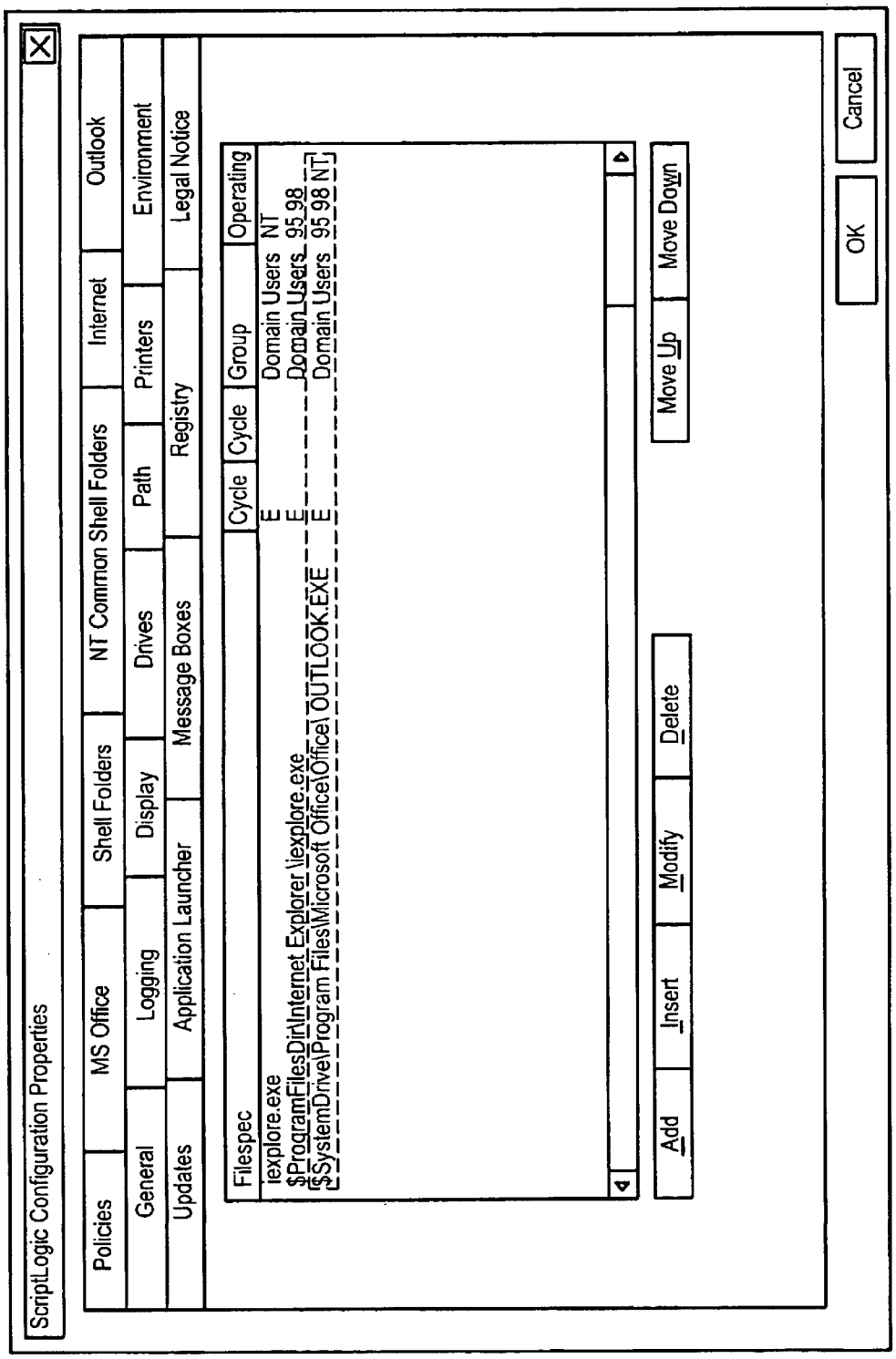
Figure 17:
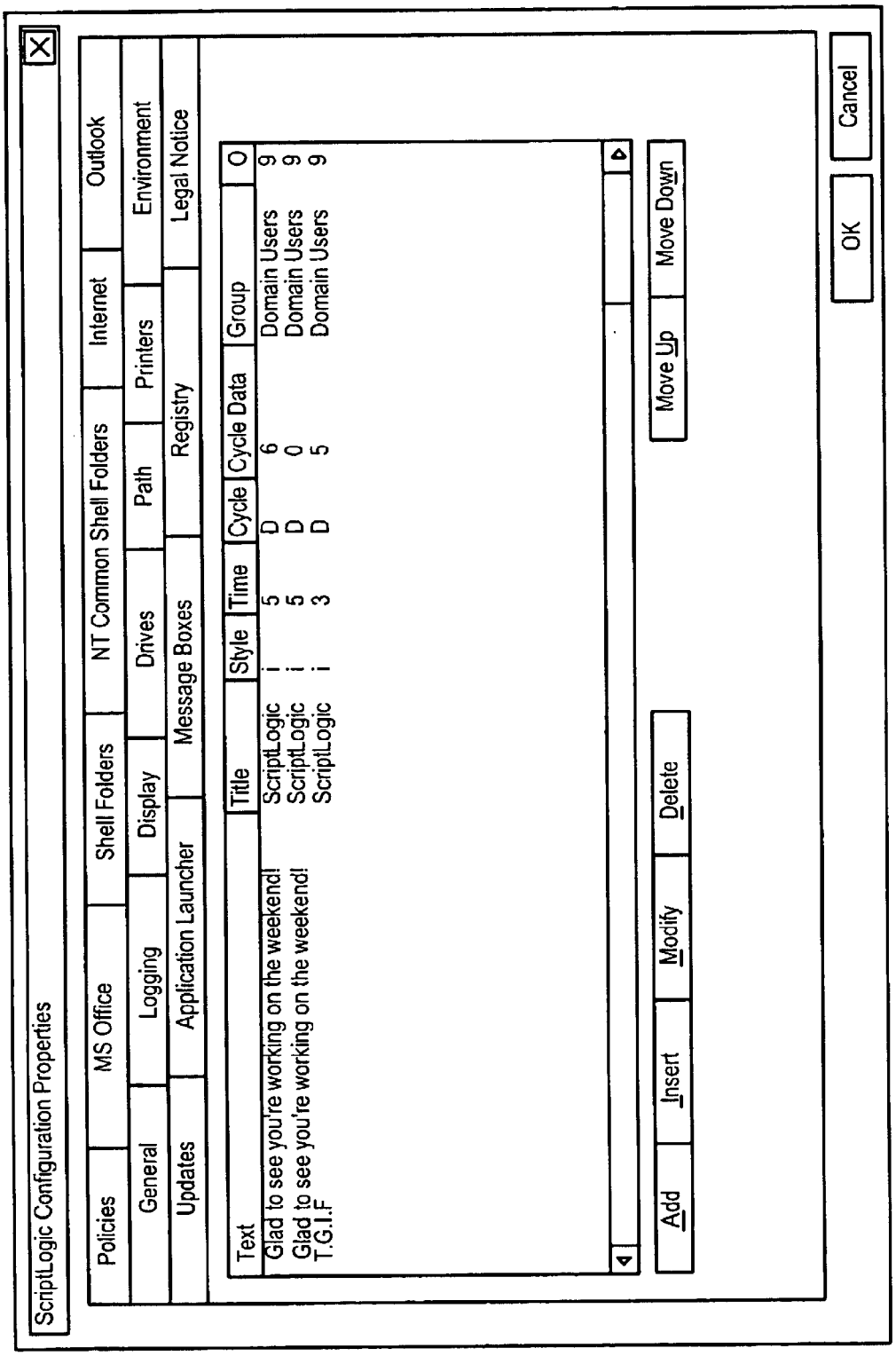
Figure 18:
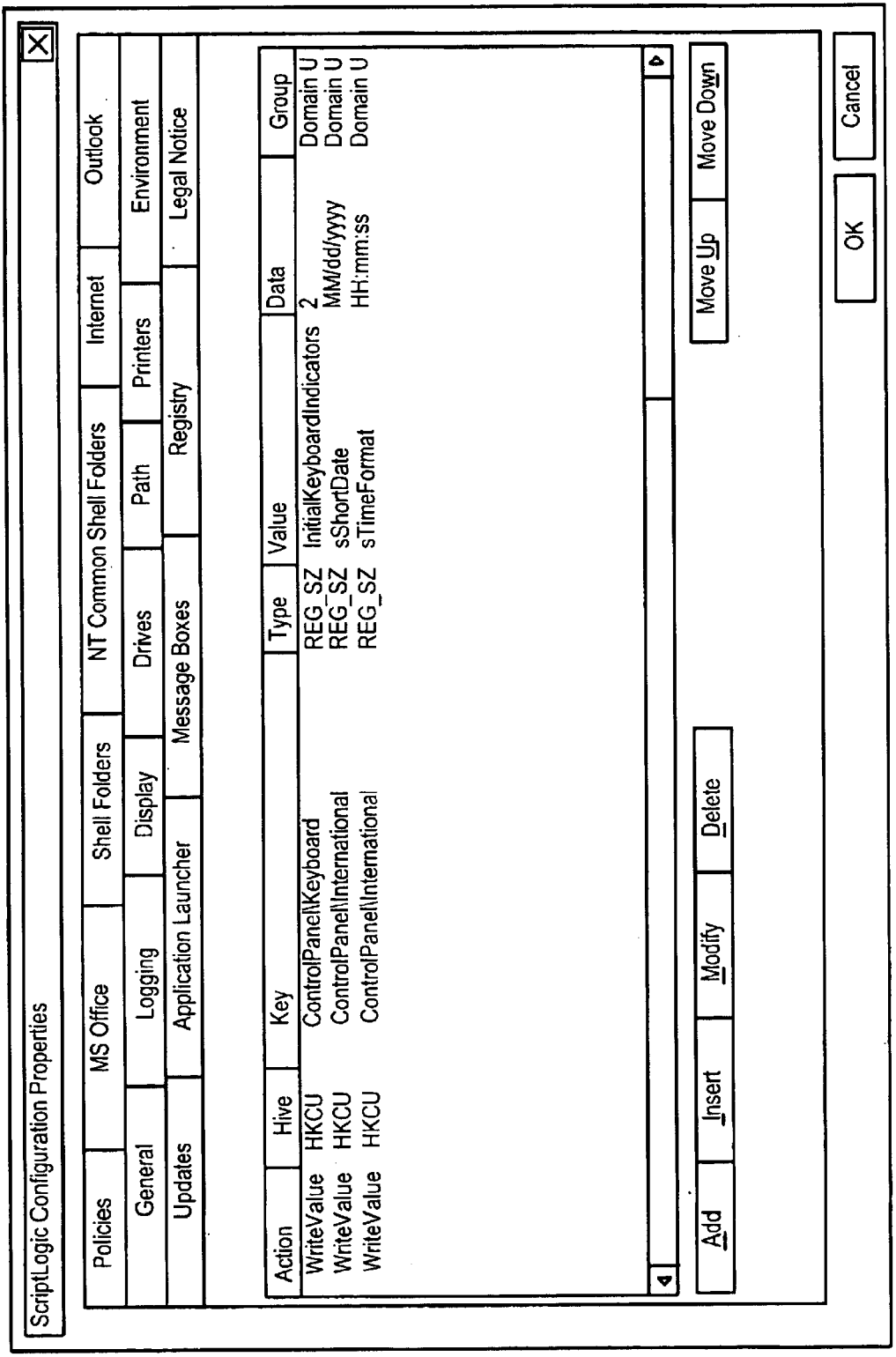
Figure 19:
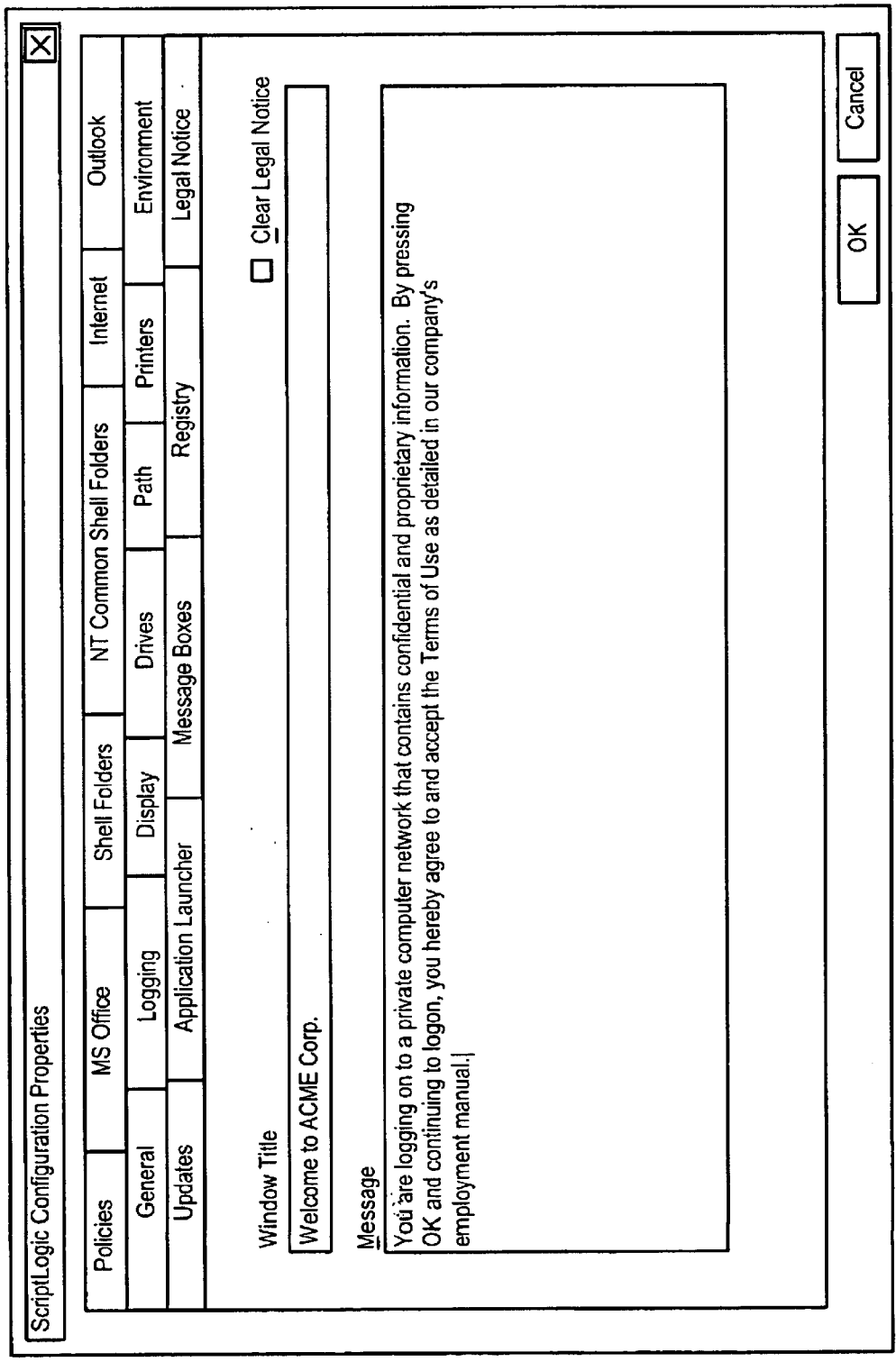
Figure 20:
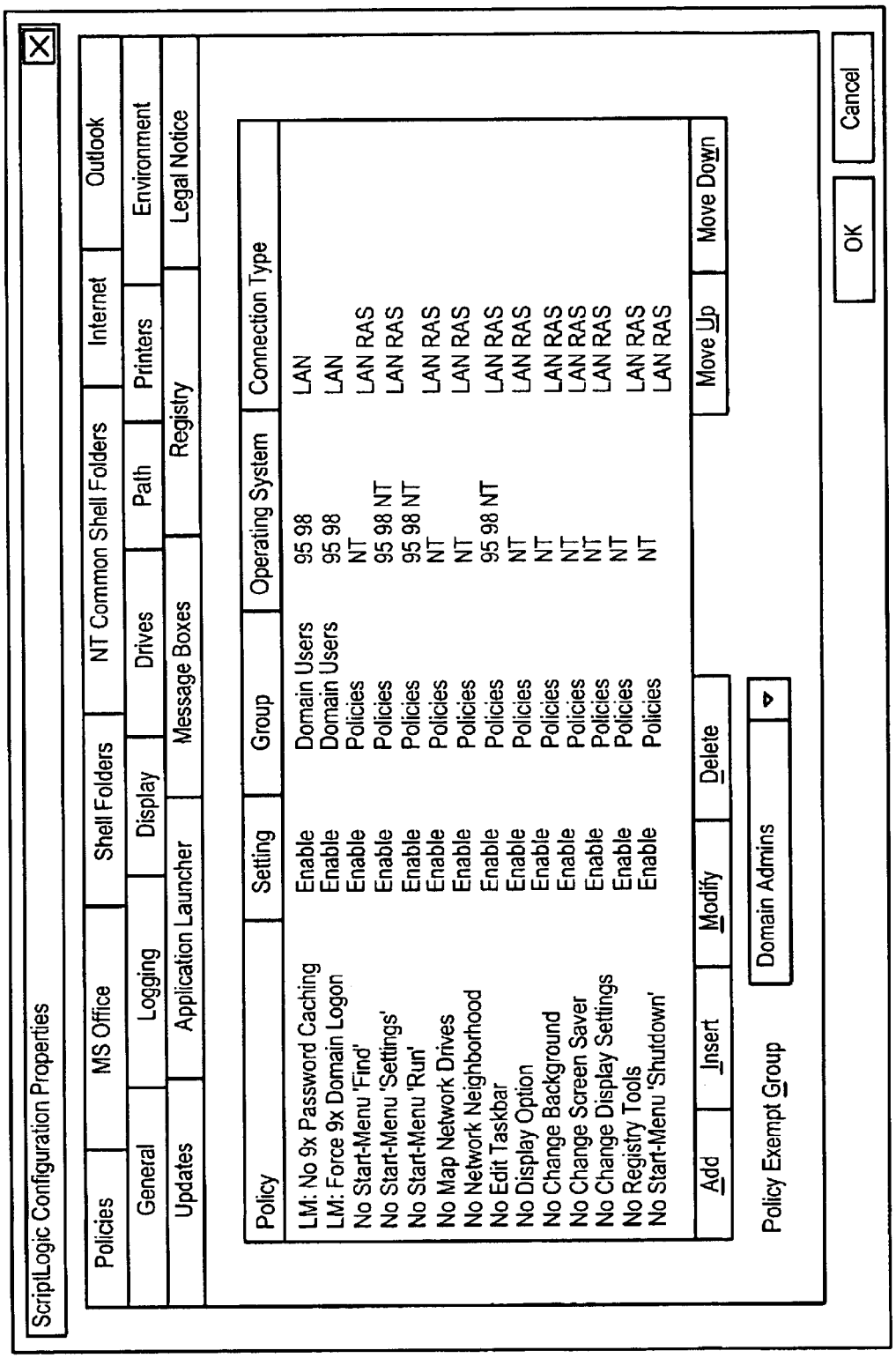
Figure 21:
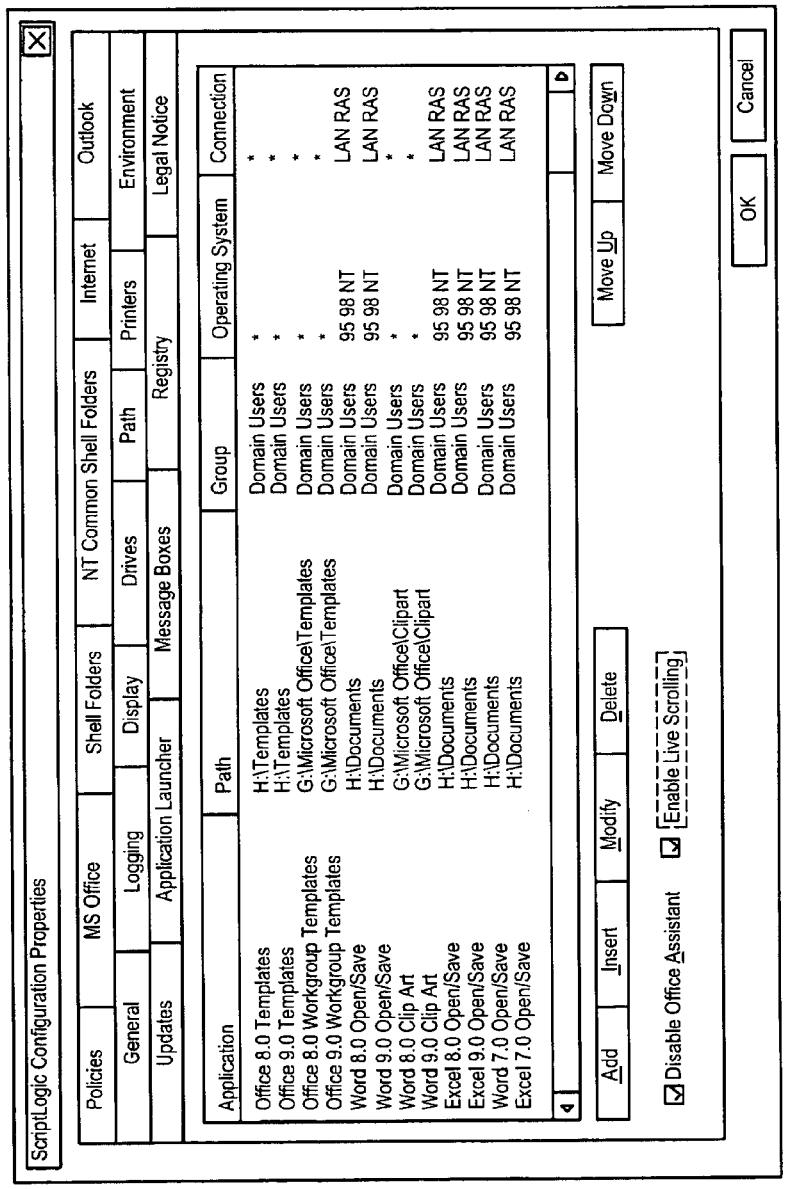
Figure 22:
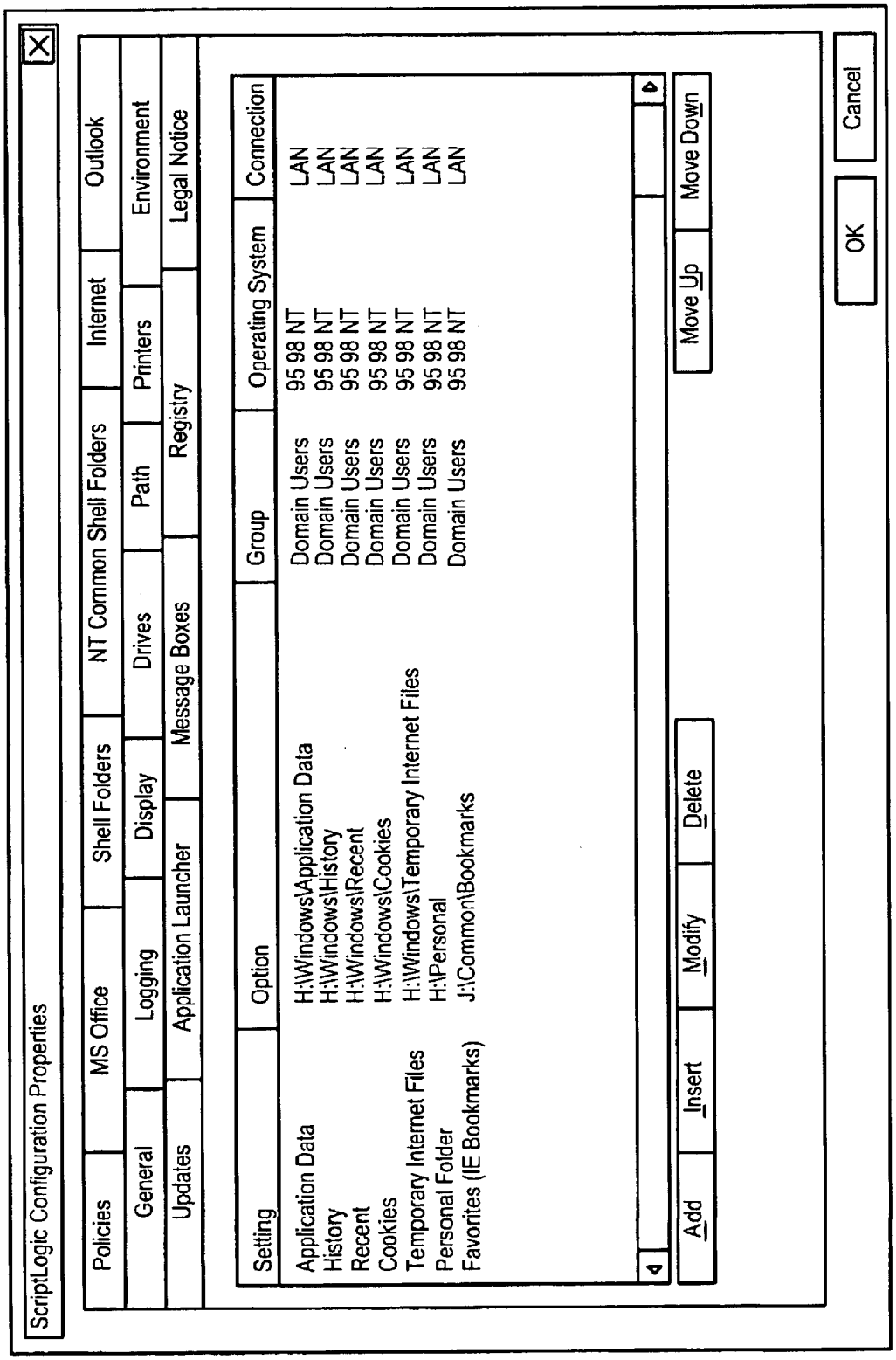
Figure 23:
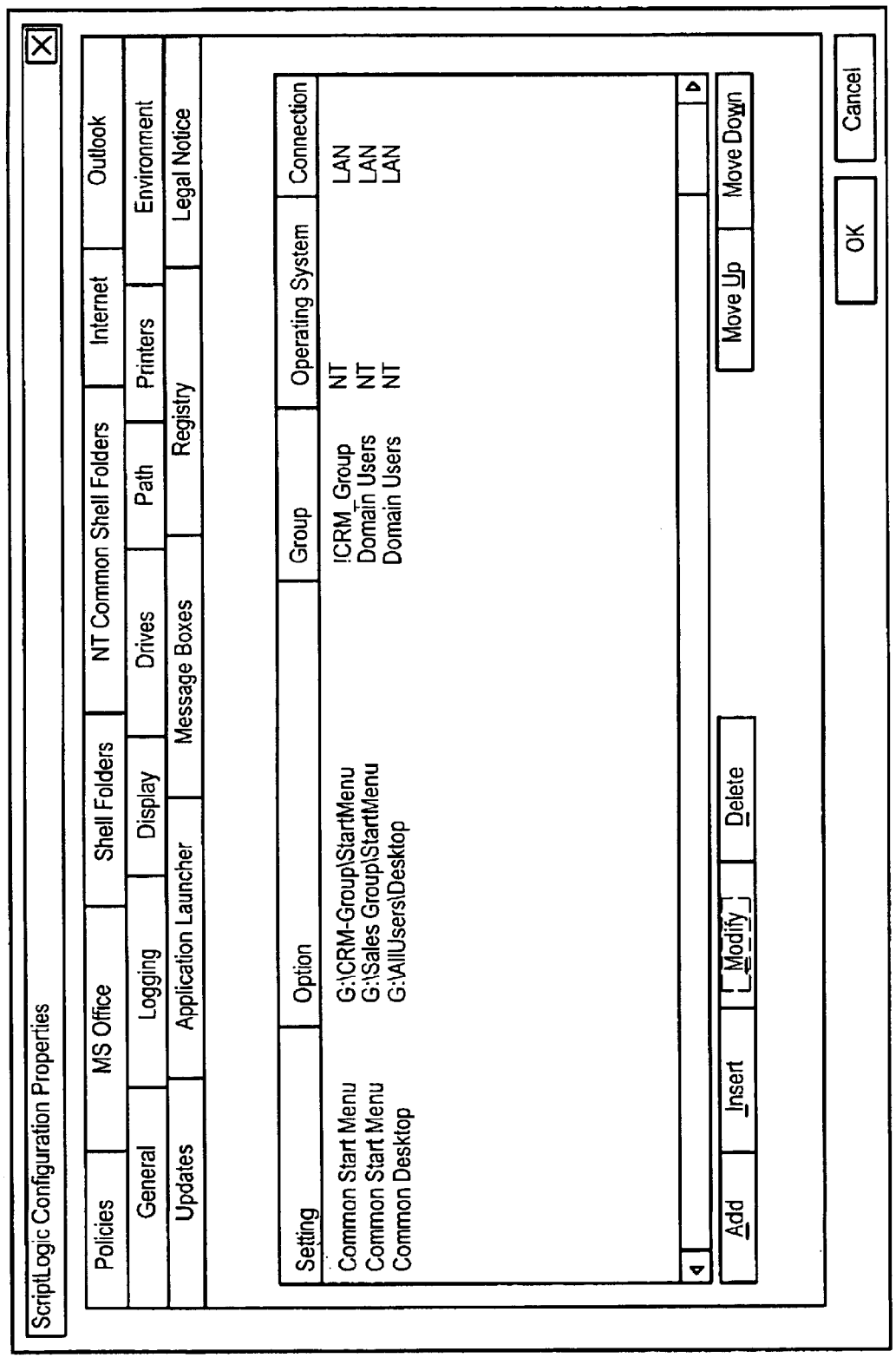
Figure 24:
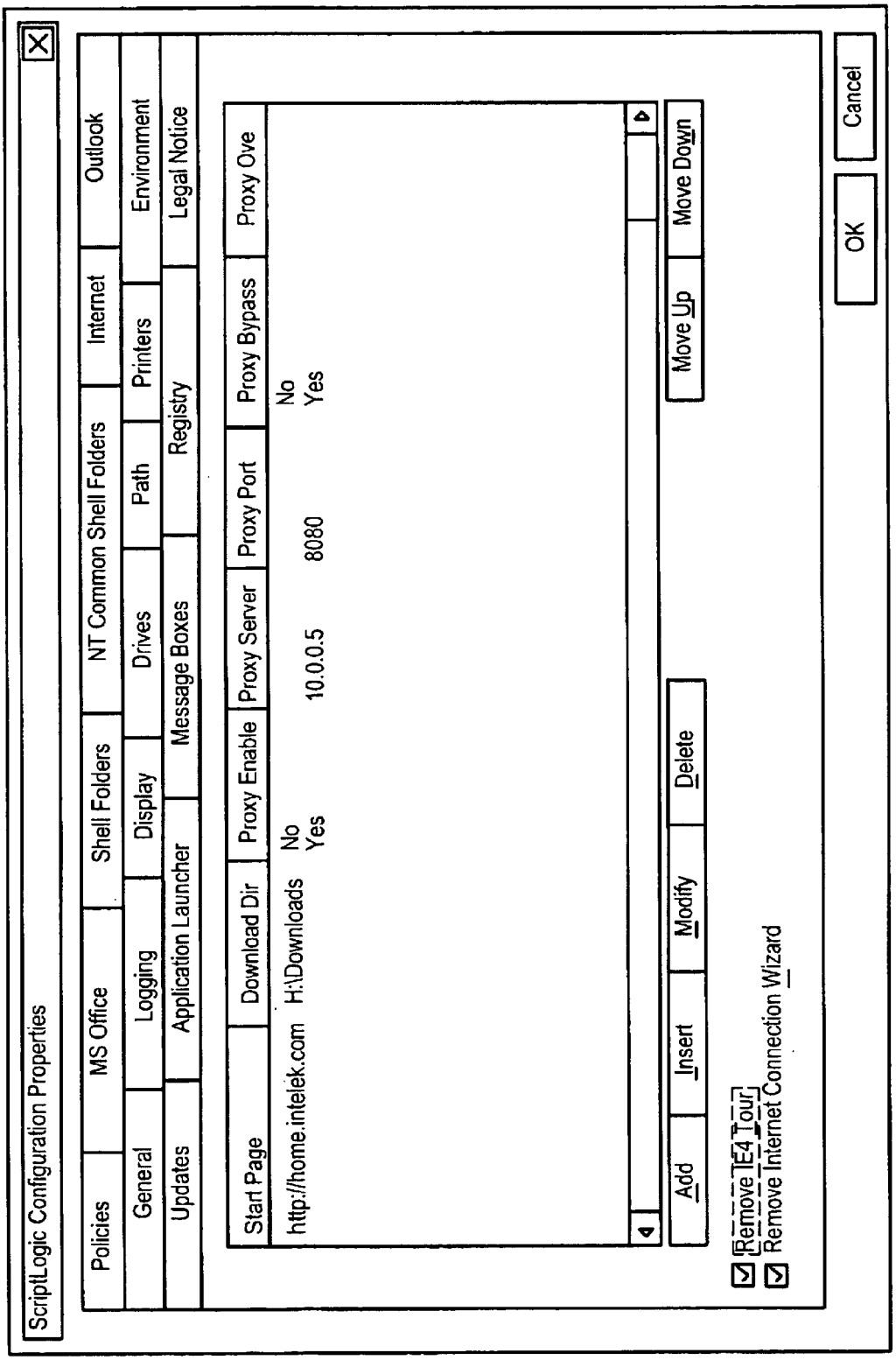
Figure 25:
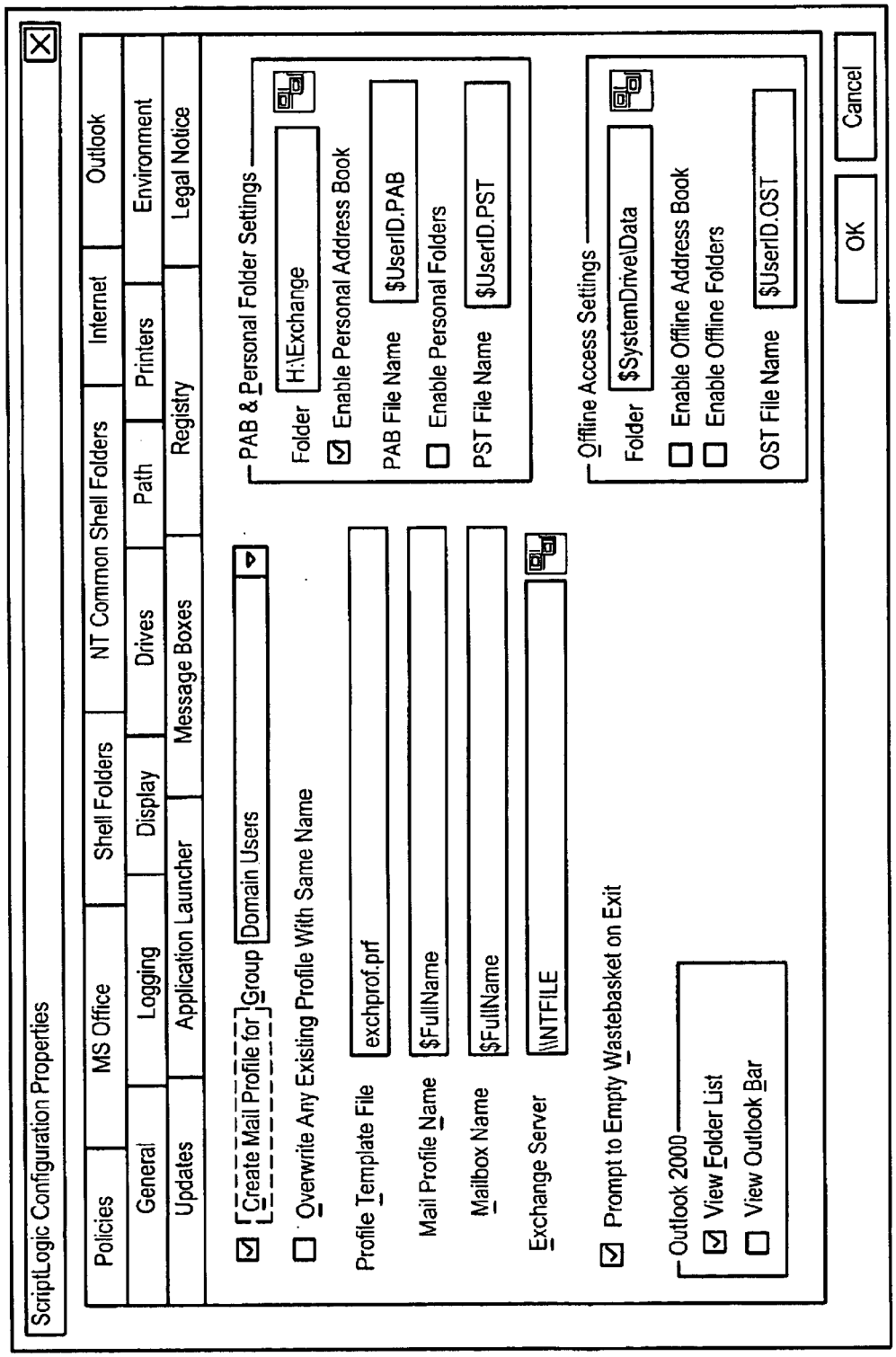

FIG. 5 is a flow diagram of the client-server process flow 500 according to the present invention. The process begins in step 502 with the GUI Manager 402 where the administrator enters information. FIGS. 8–25 are exemplary screen shots of the GUI Manager 402 graphical scripting tool. FIG. 7 illustrates a user screen for an example drive settings Drive Settings 700. All of the values shown in FIG. 7 are based on FIG. 11A pull down of possible drive letters 702 is selectable, the share. The shared folder is shown. In an optional embodiment, validation logic test to see if certain user selections are within predefined bounds. For example window 714 shows a window of the possible types with an address 798. Check boxed 710 allows certain types of operating environment. Connection types of LAN or RAS (Remote Access Service).

It is important to note that the combination of one or more conditions for the group, the operating system 306 and the connection method selected using the GUI Manager 402 is checked. In the case that the particular selection does not meet one of these conditions including but not limited group, MAC address, user name, workstation name, TCP/IP address, host address, site, domain, operating system and connection method then the selection or setting is skipped. For example the template may request a certain drive letter for the client 108, say drive letter "O" to be mapped a particular resource, say a CD ROM on a server 102, however this can only happen if the user of the client 108 is a member of a particular group. Returning to FIG. 7, the drive mapping "H" 722 would only be mapped if the following conditions are met: the computer that the user is logging. onto has a TCP/IP address beginning with "10.150." and have "Windows 98" operating system installed and is directly connect to a LAN i.e., not connected using a dial-up connection.

Figure 26:
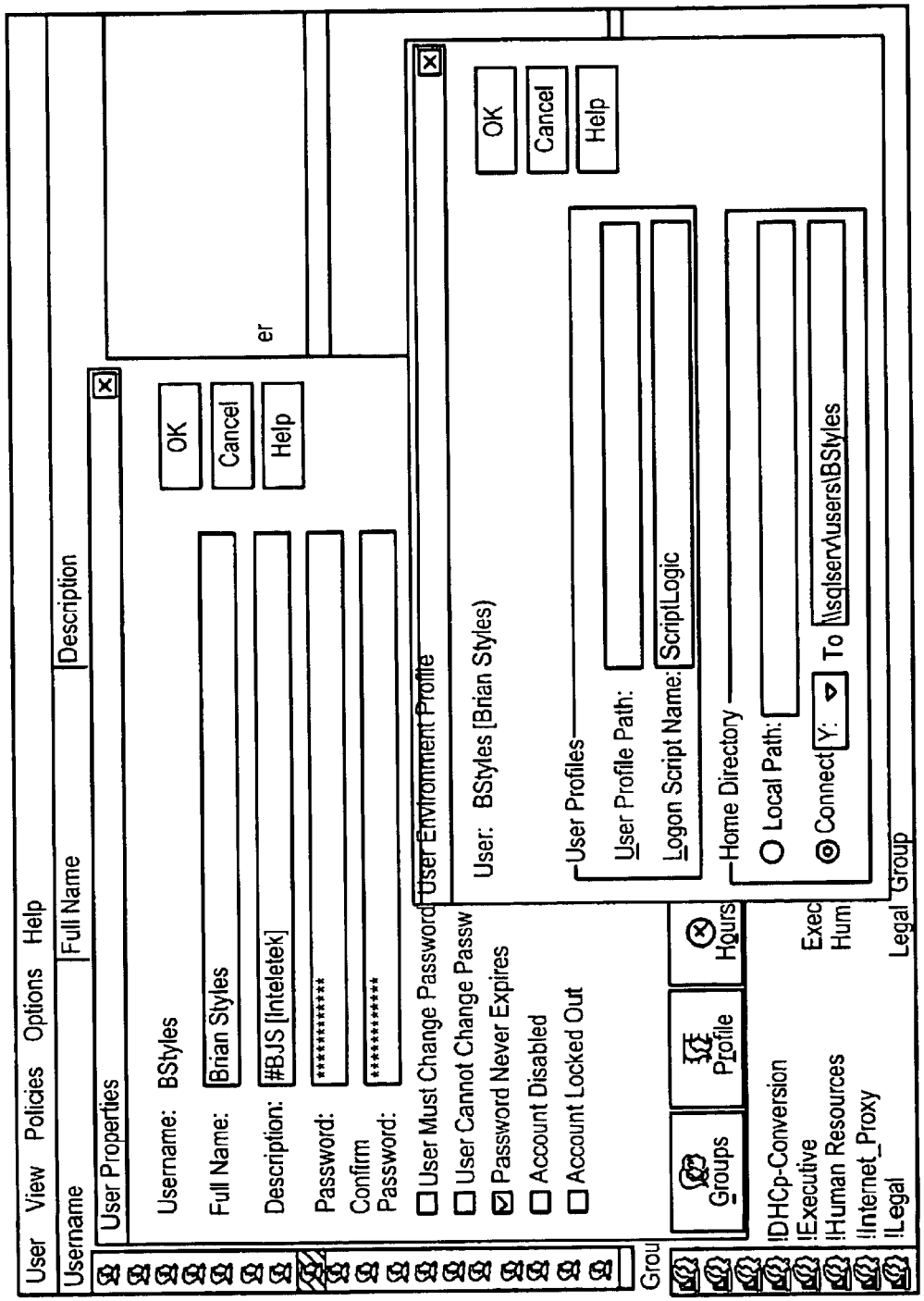
FIG. 26 is an exemplary screen shot of the user's profile of the graphical scripting tool.

Referring to FIG. 26 as the template 404 is applied to client 108 the engine 408 will substitute actual values in place of dynamic variables. Such as "$HomeServer" here in FIG. 26 is "sqlserv" and "$HomeDir" with "BStyles".

The information selected from the GUI Manager 402 screens are stored in the template 404, step 504. For each client 108, a template 404 is pulled down or read from the server 102, step 506.

The client 108 is started, step 510. The operating system 306 loads step 512. The user logon onto the network 116, step 514 and the operating system loads the user profile for the login, step 516. Now the logon script program 410 executes, step 508. During the execution the logon script program takes user & computer information as well as information for the user's profile in the domain database, step 518 and the configuration and/or template downloaded from the server 102, step 506. Returning to FIG. 7 for example, field 704 having the variables "$HomeServer" an "$HomeDir" are replaced with the corresponding values that are extracted from the users profile in the domain database. The logon script program 410 applies each component of the configuration to the client 108 based on such criteria such as group membership of the user, user's logon ID, IP subnets, computer name and more, step 520. As a result of the logon script program 520, the client computer and software applications are automatically configured for the user that logged ion the client 108 based on the template 404. The logon script program 410 completes step 524 and the client 108 logon process completes 526.

It is important to note that although the flow diagrams have depicted this graphical scripting tool to be used during logon and boot-up of the client system, it will be obvious to those of average skill in the art, that the occurrence of the scripting for configuration one or more resources on a client 108 can occur at times other than boot-up and power-on.

One Embodiment of a Graphical Logon Tool Client Architecture

Figure 6:
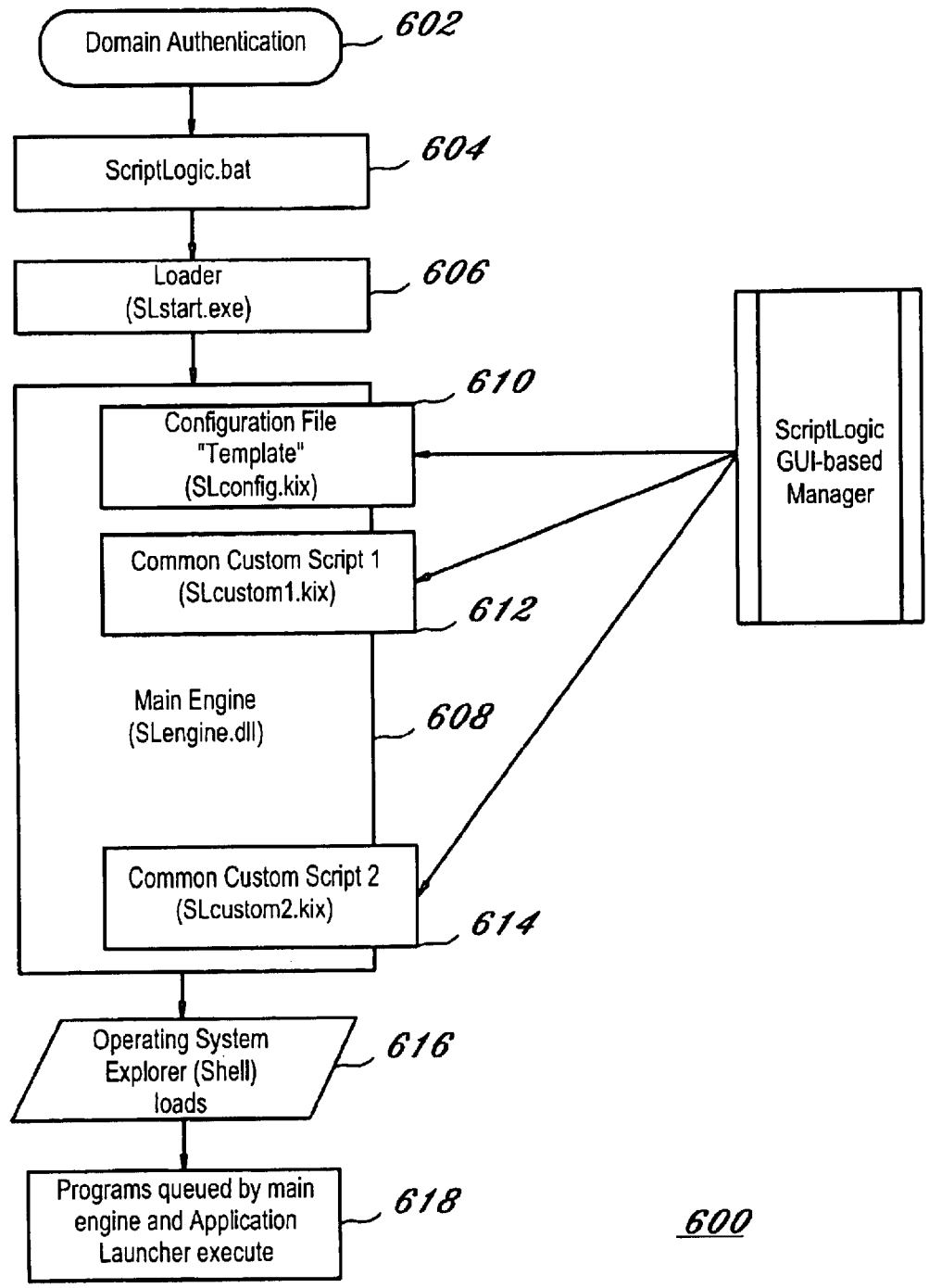
FIG. 6 is a block diagram of the graphical logon tool architecture on a client according to the present invention.

FIG. 6 is a block diagram 600 of the graphical logon tool architecture 600 on a client 108 according to the present invention. This process flow shown below is particularly suited for a Microsoft Windows 95, 98, NT or 2000 environment, however, as described above the teachings of this present invention work in other operating system environments as well.

This architecture overview 600 focuses on the script component and the process that executes on the client 108 during the domain logon process.

Domain authentication block 602—Prior to the execution of the logon script program 410, each user must first authenticate to the domain. Only domain users that have "ScriptLogic™" assigned to them as the logon script program 410 field under the profiles page of the user's properties in user Manager for Domains (UM) will execute the logon script program 410. Refer to FIG. 26 for an example. It is important to note that in this embodiment, the process of Domain Authentication 602 is not a part of logon script program 410 itself and shown here as a convenient reference for those skilled in the network administration art.

scriptlogic.bat 604—After the domain authentication block 602, a batch file performs the following tasks:
  (i) Check to make sure %windir% is a valid environment variable. In this embodiment, the logon script program 410 was designed to run on Windows 32-bit platforms only. If %windir% is not configured by the operating system 306, logon script program 410 assumes it was executed on an operating system 306 other than 95, 98, NT or 2000 and will not proceed.
  (ii) Determines whether the client 108 should bypass executing the script. If a file named SLbypass exists in the root directory of the system drive, logon script program 410 will not execute.
  (iii) Checks to see if the logon script program 410 client files exist on the client's 108 local storage. If logon script program 410 has been executed on this client 108 before, the built-in automatic "push" technology would have copied the logon script program 410 client files down from the server 102 to a client 108 \ScriptLogic folder on the boot or system drive. Executing logon script program 410 from the client's local storage save network bandwidth and greatly reduce RAS/dial-up networking/VPN logon time.
  (iv) The logon script program 410 is launched by executing SLstart.exe from either the client's \ScriptLogic folder of form the authenticating Domain Controller's NETLOGON share.

Loader (SLStart.exe) 606—is responsible for the following functions:
  (i) Verify that KIX32.exe is valid and not corrupt.
  (ii) Verify that the client's %temp% environment is configured and points to a valid folder. If %temp% is not configured, logon script program 410 will not execute. If % temp % points to a folder that does not exist, SLstart.exe will attempt to create this folder and continue. If SLstart.exe is unable to create this folder, logon script program 410 will not execute.
  (iii) Display the logon script program 410 splash screen or customer-supplied bitmap (logo.bmp).
  (iv) Load the main script engine 408 (SLengine.dll) into memory and begin processing.
  (v) Update the progress meter as different functions of the engine 408 are processed.

Engine (SLengine.dll) 608—The SLengine.dll is part of the engine 408. The SLengine.dll 608 is the compiled library that provides the core functionality of logon script program 410 and adds additional command functionality to the KiX32 interpreter. For the purpose of this diagram, SLengine 608 will be logically broken out into three (4) parts.

Part 1 performs the following initial functions:
  (i) Initialize global variables used throughout the script.
  (ii) Detect connection type (LAN or RAS)
  (iii) Read Manager-defined configuration settings from SLconfig.kix 610 into memory.

(iv) Synchronize workstation time with specified time source.

(v) Determine list of the logon script program 410 that need to be updated on client's local hard drive (if any).

Part 2 (SLengine.dll)—Part 2 is the compiled library that provides the core functionality of logon script program 410 and adds additional command functionality to the engine. In this embodiment the engine is the KiXtart™ KiX32 interpreter. Part 2 of the SLengine 608 executes the Custom Script1 612. The Custom Script executes after the Manager-defined configuration is read into memory and before the configuration is actually processed. This allows the flexibility to "override" Manager-defined variables with custom script defined variables based on specialized logic.

Part 3 of the Slengine 608 configures the client 108 by processing the majority of the Manager-defined configuration:

Check for administrator defined password expiration threshold and prompt user to change if necessary.

Configure legal notice and don't display last user name registry settings. Note with Windows NT/2000, the legal notice and don't display last user name settings will be ignored if the workstation has been configured to "AutoAdminLogon" mode.

Apply display settings.

Map drives.

Configure search path.

Capture and deploy printers.

Configure environment.

Queue any Service Packs for installation after the script completes.

Apply Policies

Configure Shell Folders.

Configure NT Common Shell Folders.

Queue Applications Launcher programs for execution after the script completes.

Configure Microsoft Office Paths.

Configure Microsoft Internet Explorer Settings.

Create Microsoft Outlook/Exchange Mail Profile.

Display Scheduled Message Boxes.

Update program 406 Log File.

Purge temporary files to keep disk space cleaned up.

Distribute application updates such as anti-virus updates.

Finally, SLengine 608 executes the Custom Script 2 614. The SLcustom2.kix 614 to launch a program based on a drive mapping. Drive mappings have not yet occurred when SLcustom1.kix 614 executes.

Part 4 of the Slengine 608 and adds additional command functionality to the interpretive engine 408:

Part 4 of the SLengine is the final stage of the engine 608 that executes after the Common Custom Script 2 614 and is responsible for removing temporary files created by the engine 608 and signaling SLstart to turn off the logon script program 410 splash screen and progress meter.

At this point logon script program 410 is removed from memory and control is returned to the operating system 306. The logon process is complete.

Custom Script 1 (SLcustom1.kix) 610—The purpose of the custom script files is to allow customization of the logon script program 410 behavior, above and beyond the functionality offered by the GUI Manager 402 and templates 404 and logon script program 410. All of the custom scripting files are ASCII files and allow the administrator to add their own KiXtart scripting code.

There are a two classifications of custom scripts that can be launched by the engine 608—they are known as the "pre-engine" and "post-engine" Custom Scripts.

Custom Script 1 (SLcustom1.kix) is the "pre-engine" script since it is launched after the Manager-defined configuration settings are read into memory and before the engine 608 processes these configuration settings. This allows administrators to "override" variables defined by the GUI Manager 402 and templates 404 with the administrator's own. For example: the administrator defines drive X: to be mapped for All Domain Users, All operating systems 306 and both connection types as the first entry in the Manager's Drives Tab. However, the administrator does not want this drive mapped for any clients with the letters "FLA" in the NetBIOS workstation name. In this case the administrator would store this entry to the SLconfig.kix file as:

$D1='Domain Users,NT 95 98,LAN RAS,X,Show, \\server1\share'The administrators's Custom Script 1 612 (SLcustom1.kix) has the following lines inserted:

```
if instr('$WkSta','FLA')
    $D1=''
endif
```

Variable Definitions (SLconfig.kix) 618—is the single file that stores all the configuration settings with GUI Manager 402 and templates 404.

Common Custom Script 2 (SLcustom2.kix) 614—The Custom.kix file is the common custom script file that resides on the Domain Controllers. The purpose of the custom script files is to allow an administrator to customize ScriptLogic's behavior, above and beyond the functionality offered by the GUI Manager402, templates 404 and the logon script program 410. All of the custom scripting files are ASCII files that can contain customized KiXtart scripting code.

There are a two classifications of custom scripts that can be launched by the engine 608—they are known as the "pre-engine" and "post-engine" custom scripts.

Custom Script 2 614 is known as the "post-engine" script since it is launched after the engine 608 processes the Manager-defined configuration settings. This allows you to "use" drive mappings and other configuration settings after logon script program 410 has applied them to the client 108.

For example: if an admistrator wants to launch the Microsoft SMS batch file specifically from the server at the user's location, and only if the client logging on is LAN-attached. The administrator has organized the user's into location-specific groups within UMD, and mapped drive S: to the appropriate server's SMS share based on group membership.

In the Custom Script 2 614 (SLcustom2.kix) the following lines would be inserted:

if $ConnType='LAN'; *only execute SMS for LAN-attached clients* SHELL '%COMSPEC%/E:1024/C S:\SMSLS.BAT' endif

Operating System Explorer (Shell Loads)—with logon script program 410 removed from memory, control is returned to the operating system 306 and the Shell (Windows Explorer) loads and displays the desktop.

Post Shell 618—After the Shell (Windows Explorer) loads into memory, programs queued for launch by the engine 608, using the registry's Run key in the HKCU hive, begin to execute.

These programs include ClrName.exe (to optionally clear the last user's name from the logon dialog box), anti-virus signature updateexecutables, ClrRun.exe (to clear the registry's Run key of any values created by the logon script program 410 launcher), and any other programs queued by the application launcher tab in the GUI Manager 402.

It has been shown that using the GUI Manager 402 to fill-in templates 404 that execute on the logon script program 410 on the client 108. The administrator does not need to compile, debug or write a single line of scripting code. The GUI manager has a select the box approach for selecting computer settings.

Using this invention, the administrator can centralize the group-based administration of drive mappings, shell folders, printer deployment, proxy server access, MS Office paths, service pack & anti-virus updates, policies and automatic Outlook/Exchange mail profile creation.

Moreover as apparent to those skilled skill in the art, the present invention can be used advantageously with other commercially available packages like Symantec Ghost & PowerQuest Drive Image. Those packages supply the initial OS and application installation and the present invention supplies the necessary user-specific customization during the logon process.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method in a client-server environment, to manage a configuration of resources on at least one client, the method on a client system comprising:

receiving a set of one or more configuration files from a server, over a previously configured network interface, the set of configuration files are identical to the set of configuration files received by other client systems attached to the server, and wherein the set configuration files containing one or more defined configuration settings, wherein the configuration files were previously built through use of a graphical interface, and without the need to create client specific text edit logon scripts; and in response to the user logging on and authenticated to the server, executing an application program that takes the set of one or more configuration files and applies at least one of the defined configuration settings to the client system so as to automatically configure for a user on the client system, zero or more configuration settings, wherein the application program excutes so as to validates at least one of the configuration settings in the configuration based on logon authentication and validates one or more of run-time environmental variables of the client system, the variables consisting of at least one of (i) an IP subnet address, (ii) a LAN group membership, and (iii) at least one registry entry, before applying the configurations settings to the client system, and wherein the application executes after the client system boots-up, loads an operating system and before an operating system shell is presented to the user.

2. The method according to claim 1, wherein the receiving set of one or more configuration files includes receiving set of one or more configuration files containing one or more defined configurations from the group of configuration settings consisting of drive mappings, shell folders, printer deployment, proxy server access, application paths, service packs, anti-virus updates, policies and automatic mail profile creation.

3. The method according to claim 1, wherein the receiving a set of one or more configuration files includes receiving a set of one or more configuration files containing one or more defined configuration settings for the operating system running on the client system.

4. The method according to claim 1, wherein the receiving a set of one or more configuration files includes receiving a set of one or more configuration files containing one or more defined configuration settings for an application running on the client system.

5. The method according to claim 1, wherein the receiving a set of one or more configuration files includes receiving a set of one or more configuration files containing one or more defined configuration settings for redirecting a resource on the client to a resource on a network.

6. The method according to claim 1, wherein the receiving a set of one or more configuration files-includes receiving a set of one or more configuration files from a server system.

7. The method according to claim 1, further comprising:

executing a interpretative engine that interprets the application program as source programming language; and wherein the step of executing an application program includes executing an application program on the interpretative engine.

8. The method according to claim 7, further comprising:

receiving a custom application script on a computer readable medium, the custom application script in a source programming that is interpreted by the interpretative engine; and wherein the step executing an application program includes executing an application program along with the custom application script so as to automatically configure for at least one user, at least one configuration setting.

9. The method according to claim 8, wherein the executing an application program includes executing the custom application script prior to the execution of the application program so as to cause the application program to alter at least one configuration setting differently then if the application program was executed after the custom application script.

10. The method according to claim 8, wherein the executing an application program includes executing the custom application script after the execution of the application program so as to cause the application program to alter at least one configuration setting differently then if the application program was executed prior to the custom application script.

11. The method according to claim 1, wherein the executing an application program includes executing an application program that takes the set of one or more configuration files and applies at least one of the defined configuration settings to the client system so as to automatically configure for at least one user on the client system, at least one configuration setting if the combination of one or more predefined conditions for selected group, MAC address, user name, workstation name, TCP/IP address, host address, site, domain, operating system and connection method are met.

12. The method according to claim 1, wherein the executing an application program includes executing an application program that takes the set of one or more configuration files and applies at least one of the defined configuration settings to the operating system running on the client system so as to automatically configure for at least one user on the client system, at least one configuration setting if the combination of one or more predefined conditions for a selected group, MAC address, user name, workstation name, TCP/IP address, host address, site, domain, operating system and connection method are met.

13. The method according to claim 1, wherein the executing an application program includes executing an application program that takes the set of one or more configuration files and applies at least one of the defined configuration settings to an application running on the client system so as to automatically configure for at least one user on the client system, at least one configuration setting if the combination of one or more predefined conditions for a selected group, MAC address, user name, workstation name, TCP/IP address, host address, site, domain, operating system and connection method are met.

14. The method according to claim 1, wherein the executing an application program includes executing an application program that takes the set of one or more configuration files and applies at least one of the defined configuration settings to redirect a resource on the client to a resource on a network so as to automatically configure for at least one user on the client system, at least one configuration setting if the combination of one or more predefined conditions for a selected group, MAC address, user name, workstation name, TCP/IP address, host address, site, domain, operating system and connection method are met.

15. A method in a client-server environment, to manage a configuration of resources on at least one client, the method on a server system comprising:
presenting a graphical user interface to a user containing user selectable items representing one or more configuration settings for at least one user on at least one client system and wherein the settings are customized without the need to create client specific text edit logon scripts;
receiving one or more user selections on the graphical user interface;
storing the one or more user selections in a set of one or more configuration files so as to automatically configure for at least one user on the client system, at least one configuration setting, wherein the set of configuration files are identical to configuration files received by other client systems attached to a server; and
transferring the the set of one or more configuration files from the server over a previously configured network interface to the client system so at to cause an application program to take the set of one or more configuration files and apply at least one of the defined configuration settings to the client system so as to automatically configure for the user on the client system, at least one configuration setting, wherein the application program is loaded and validates at least one of the configuration settings based on logon authentication and validates one or more run-time environmental variables of the client system, the variables consisting of an IP subnet address, a LAN group membership, and a registry entry, before applying the configurations settings to the client system, and wherein the application executes after the client system boots-up, loads an operating system and before an operating system shell is presented to the user.

16. A method according to claim 15, wherein the receiving one or more selections includes receiving one or more configuration settings from the group of configuration settings consisting of drive mappings, shell folders, printer deployment, proxy server access, application paths, service packs, anti-virus updates, policies and automatic mail profile creation.

17. The method according to claim 15, wherein the transferring a configuration includes transferring a configuration containing one or more defined configuration settings for the operating system running on the client system.

18. The method according to claim 15, wherein the transferring a configuration includes transferring a configuration containing one or more defined configuration settings for an application running on the client system.

19. The method according to claim 15, wherein the transferring a configuration includes transferring a configuration containing one or more defined configuration settings for redirecting a resource on the client to a resource on a network.

20. The method according to claim 15, wherein the transferring set of one or more configuration files the configuration includes transferring the set of one or more configuration files configuration to at least one client system so as to cause an application program to take the set of one or more configuration files and apply at least one of the defined configuration settings to the client system so as to automatically configure for at least one user on the client system, at least one configuration setting if the combination of one or more predefined conditions for a selected group, MAC address, user name, workstation name, TCP/IP address, host address, site, domain, operating system and connection method are met.

21. The method according to claim 20, wherein the transferring the set of one or more configuration files includes transferring the set of one or more configuration files to at least one client system so at to cause an application program to take the set of one or more configuration files and apply at least one of the defined configuration settings to an operating system running on the client system so as to automatically configure for at least one user on the client system, at least one configuration setting if the combination of one or more predefined conditions for selected group, MAC address, user name, workstation name, TCP/IP address, host address, site, domain, operating system and connection method are met.

22. The method according to claim 20, wherein the transferring the set of one or more configuration files includes transferring set of one or more configuration files to at least one client system so at to cause an application program to take the set of one or more configuration files and apply at least one of the defined configuration settings to an application running on the client system so as to automatically configure for at least one user on the client system, at least one configuration setting if the combination of one or more predefined conditions for a selected group, MAC address, user name, workstation name, TCP/IP address, host address, site, domain, operating system and connection method are met.

23. The method according to claim 20, wherein the transferring the set of one or more configuration files includes transferring the set of one or more configuration files to at least one client system so at to cause an application program to take the set of one or more configuration files and apply at least one of the defined configuration settings to redirect a resource on the client to a resource on a network so as to automatically configure for at least one user on the client system, at least one configuration setting if the combination of one or more predefined conditions for selected group, MAC address, user name, workstation name, TCP/IP address, host address, site, domain, operating system and connection method are met.

24. A computer readable medium containing programming instructions on a client system in a client-server environment, the programming instructions for managing a configuration of resources on at least one client, the computer readable medium comprising the instructions of:

receiving a set of one or more configuration files from a server, over a previously configured network interface, the set of configuration files are identical to configuration files received by other client systems attached: to the server, and wherein the set configuration files containing one or more defined configuration settings, wherein the configuration files were previously built through use of a graphical interface, and without the need to create client specific text edit logon scripts; and in response to the user logging on and authenticated to the server, executing an application program that takes the set of one or more configuration files and applies at least one of the defined configuration settings to the client system so as to automatically configure for a user on the client system, zero or more configuration settings, wherein the application program executes so as to validates at least one of the configuration settings in the configuration based on logon authentication and validates one or more of run-time environmental variables of the client system, the variables consisting of at least one of (i) an IP subnet address, (ii) a LAN group membership, and (iii) at least one registry entry, before applying the configurations settings to the client system, and wherein the application executes after the client system boots-up, loads an operating system and before an operating system shell is presented to the user.

25. The computer readable medium according to claim 24, wherein the programming instruction of receiving a set of one or more configuration files includes receiving a set of one or more configuration files containing one or more defined configurations from the group of configuration settings consisting of drive mappings, shell folders, printer deployment, proxy server access, application paths, service packs, anti-virus updates, policies and automatic mail profile creation.

26. The computer readable medium according to claim 24, wherein the programming instruction of executing an application program includes executing an application program that takes the set of one or more configuration files and applies at least one of the defined configuration settings to the client system so as to automatically configure for at least one user on the client system, at least one configuration setting if the combination of one or more predefined conditions for selected group, MAC address, user name, workstation name, TCP/IP address, host address, site, domain, operating system and connection method are met.

27. A client system to manage the configuration of at resource in a client-server environment comprising:

means for receiving a set of one or more configuration files from a server, over a previously configured network interface, the set of configuration files are identical to configuration files received by other client systems attached to the server, and wherein the set configuration files containing one or more defined configuration settings, wherein the configuration files were previously built through use of a graphical interface, and without the need to create client specific text edit logon scripts; and in response to the user logging on and authenticated to the server, means for executing an application program that takes the set of one or more configuration files and applies at least one of the defined configuration settings to the client system so as to automatically configure for a user on the client system, zero or more configuration settings, wherein the application program executes so as to validates at least one of the configuration settings in the configuration based on logon authentication and validates one or more of run-time environmental variables of the client system, the variables consisting of at least one of (i) an IP subnet address, (ii) a LAN group membership, and (iii) at least one registry entry, before applying the configurations settings to the client system, and wherein the application executes after the client system boots-up, loads an operating system and before an operating system shell is presented to the user.

28. The system according to claim 27, wherein the means for receiving a configuration includes receiving a set of one or more configuration files containing one or more defined configurations from the group of configuration settings consisting of drive mappings, shell folders, printer deployment, proxy server access, application paths, service packs, anti-virus updates, policies and automatic mail profile creation.

29. The system according to claim 27, wherein the means for executing an application program includes executing an application program that takes the set of one or more configuration files and applies at least one of the defined configuration settings to the client system so as to automatically configure for at least one user on the client system, at least one configuration setting if the combination of one or more predefined conditions for selected group, MAC address, user name, workstation name, TCP/IP address, host address, site, domain, operating system and connection method are met.

* * * * *